United States Patent [19]
Taniguchi et al.

[11] Patent Number: 6,064,456
[45] Date of Patent: May 16, 2000

[54] PROCESS FOR MANUFACTURING REFLECTION-TYPE LIQUID CRYSTAL DISPLAY APPARATUS

[75] Inventors: Koji Taniguchi, Nara; Toru Matano, Tenri; Yasunori Shimada, Kashihara, all of Japan

[73] Assignee: Sharp Kabushiki Kaisha, Osaka, Japan

[21] Appl. No.: 09/097,923

[22] Filed: Jun. 16, 1998

[30] Foreign Application Priority Data

Jun. 17, 1997 [JP] Japan .................................. 9-160311
Apr. 24, 1998 [JP] Japan .................................. 10-115813

[51] Int. Cl.$^7$ ............................................. G02F 1/1345
[52] U.S. Cl. .................... 349/113; 349/113; 349/149; 438/30
[58] Field of Search ............................ 349/113, 122, 349/138, 152, 149, 42; 438/30

[56] References Cited

U.S. PATENT DOCUMENTS 5,610,746  3/1997  Kimura et al. ...................... 349/113
5,949,507  9/1999  Shimada et al. ..................... 349/113

FOREIGN PATENT DOCUMENTS 6-75238   3/1994   Japan .
8-254714  10/1996  Japan .

*Primary Examiner*—Kenneth Parker
*Attorney, Agent, or Firm*—Nixon & Vanderhye, P.C.

[57] ABSTRACT

The present invention provides a process for manufacturing a reflection-type liquid crystal display apparatus. The method includes the steps of: forming scanning lines, signal lines, a thin film transistor and a connector electrode on a substrate; forming a photosensitive resin film covering at least the connector electrode, and forming a reflection electrode film on the photosensitive resin film and other portions; removing a portion of the reflection electrode film located at least on the connector electrode, and patterning the reflection electrode film so that the pixel electrode resides in the display region; and removing a portion of the photosensitive resin film located on the connector electrode to reveal the connector electrode.

7 Claims, 30 Drawing Sheets

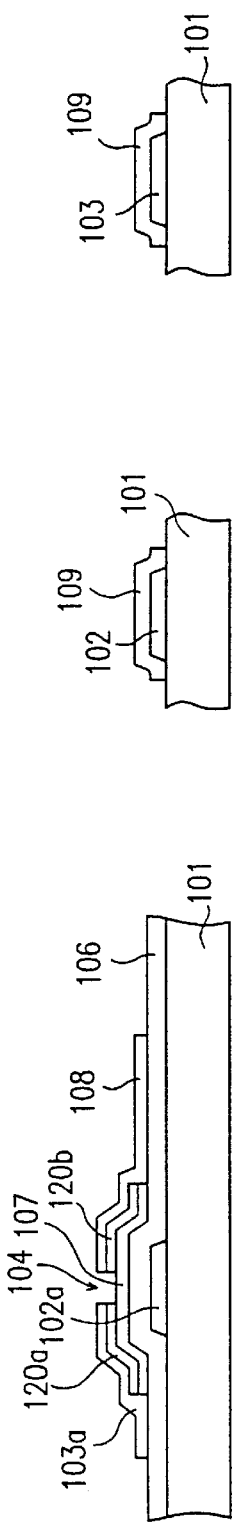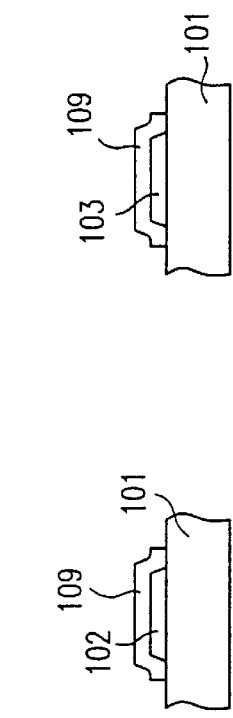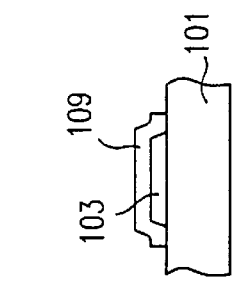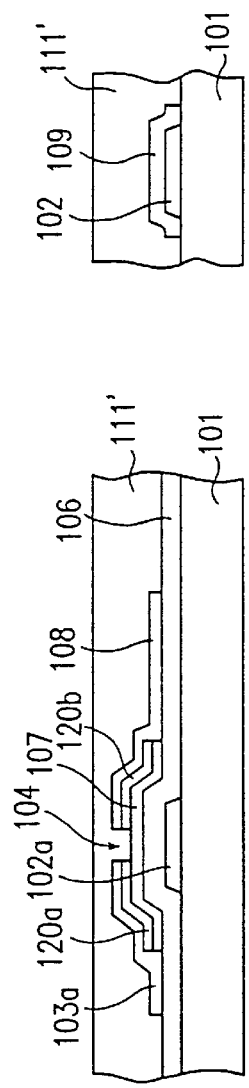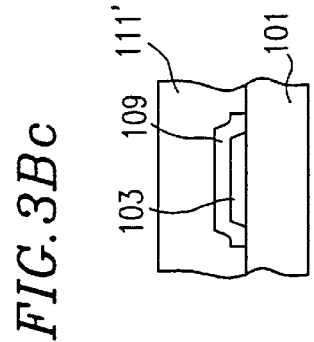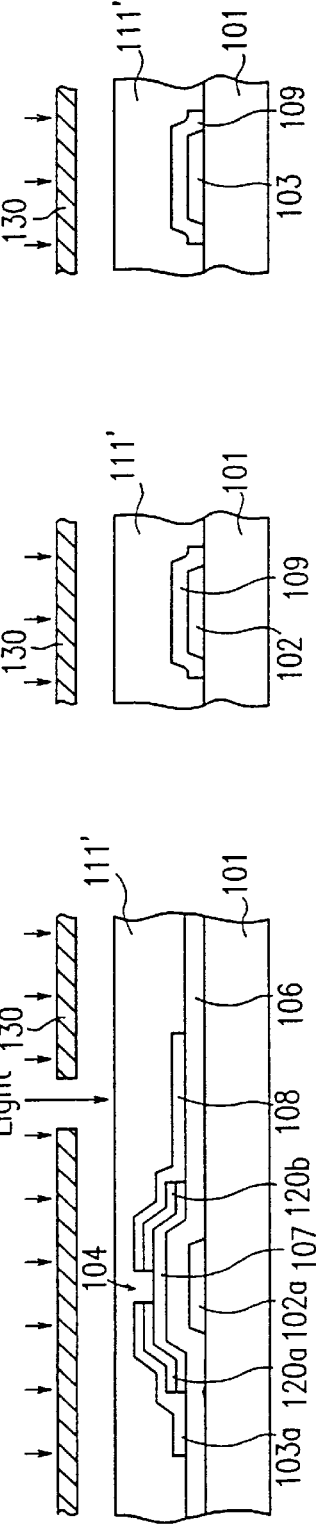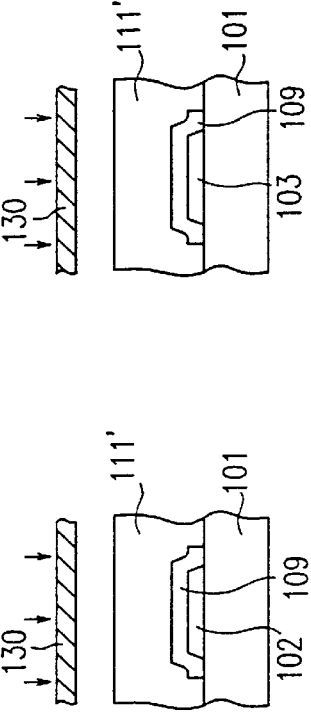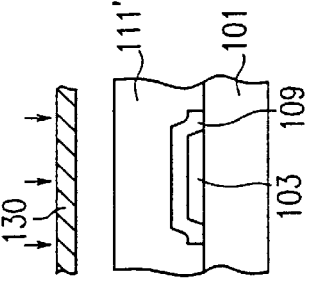

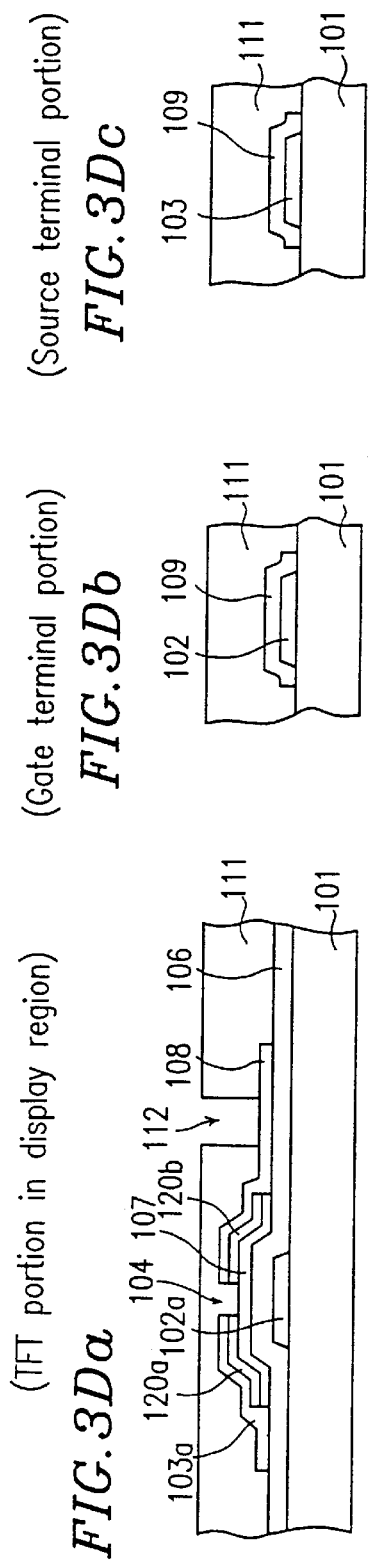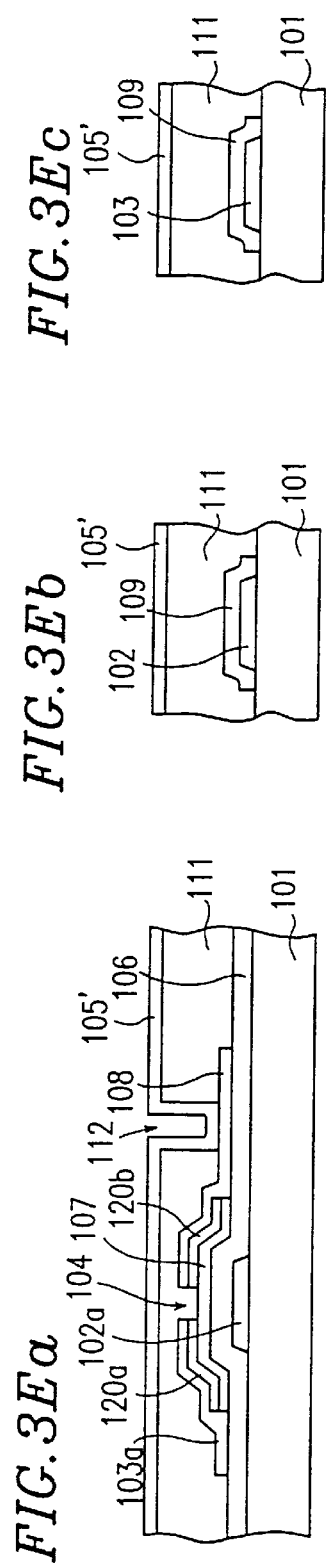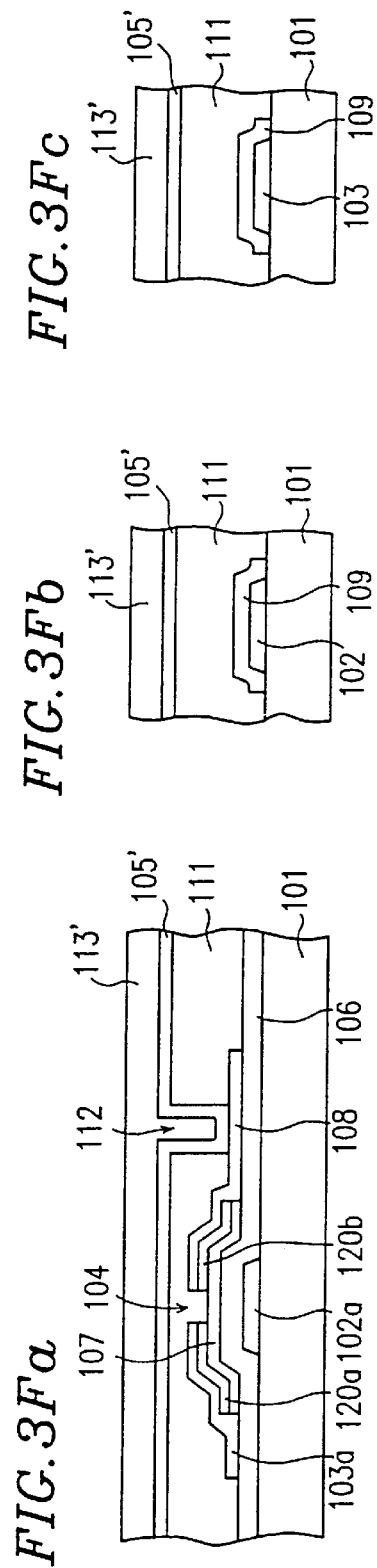

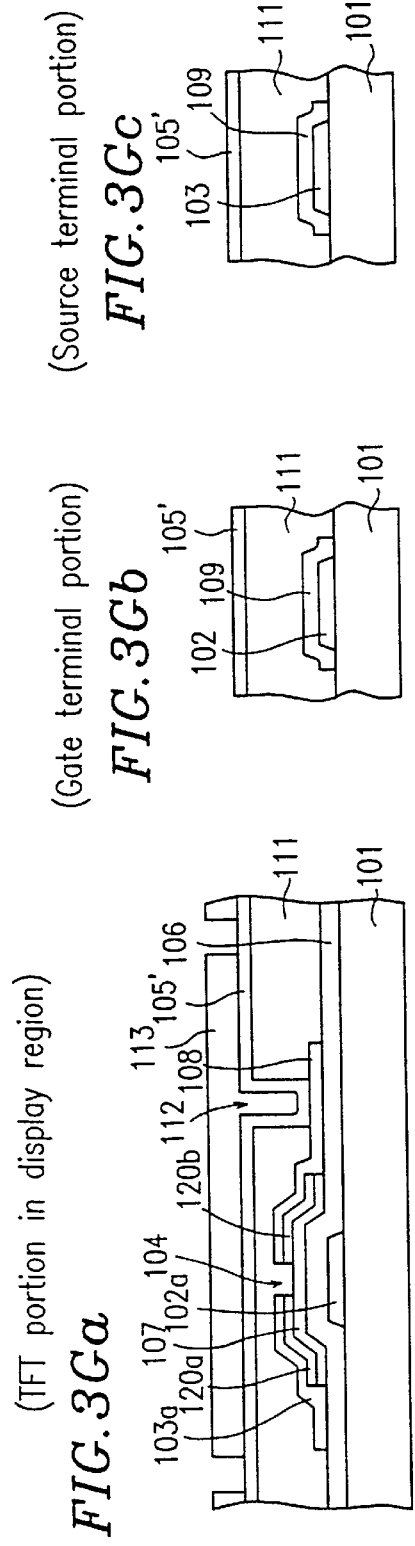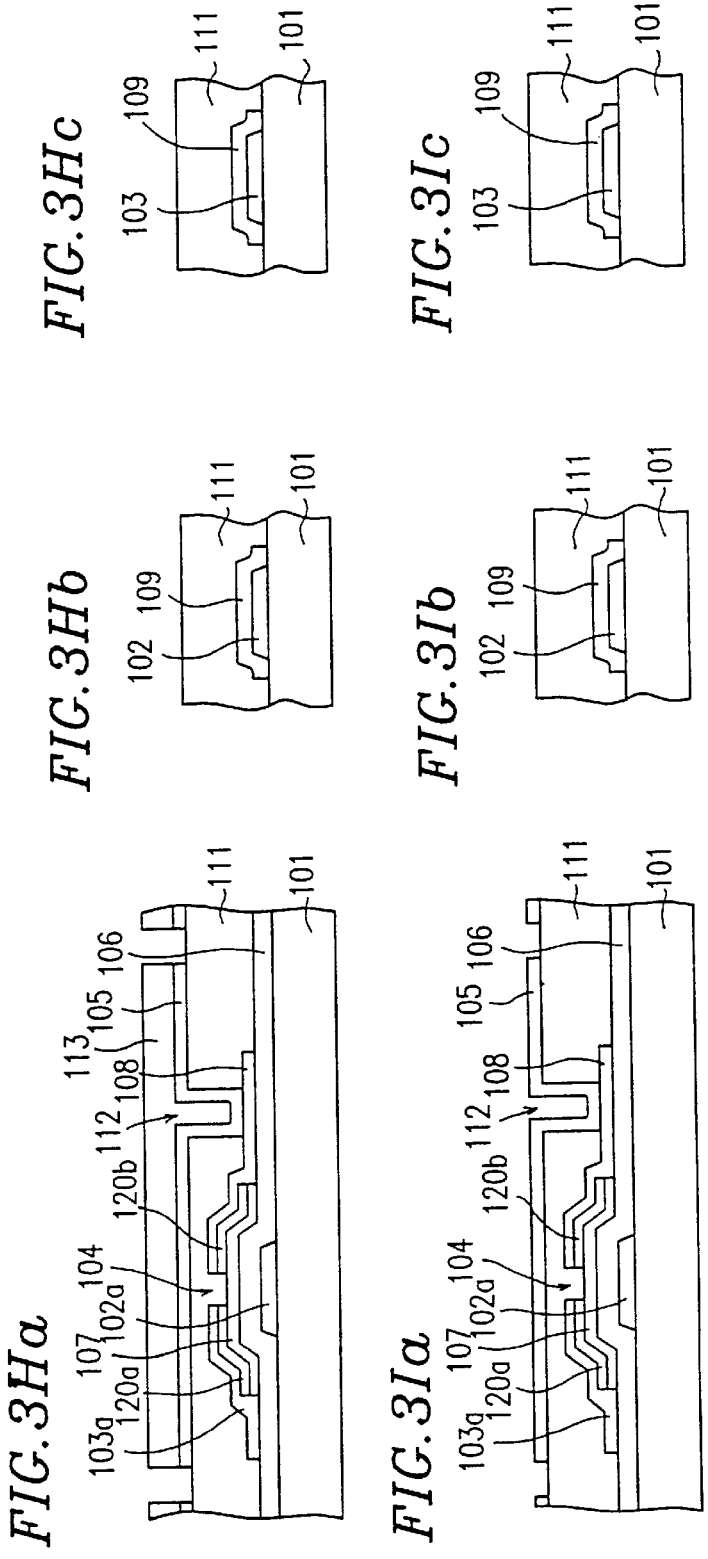

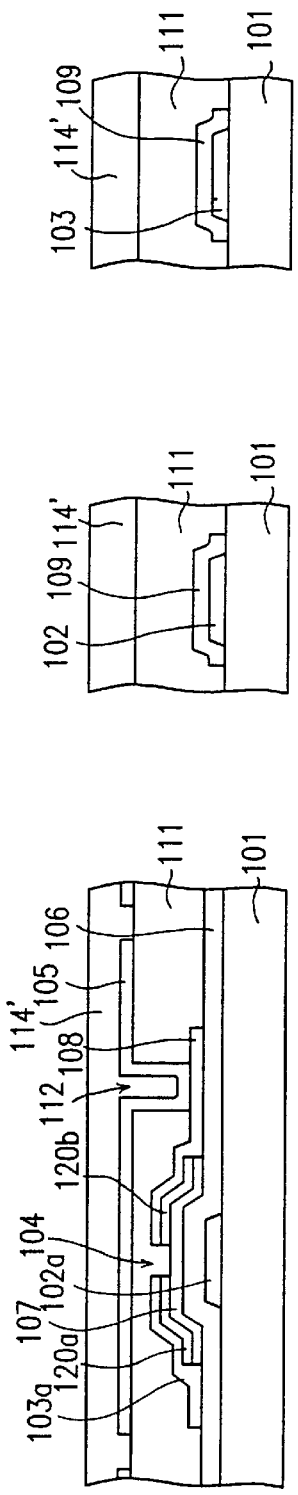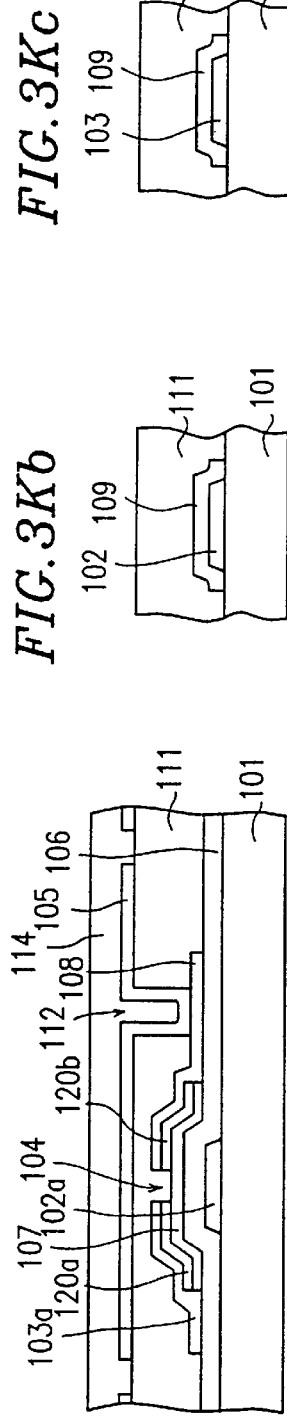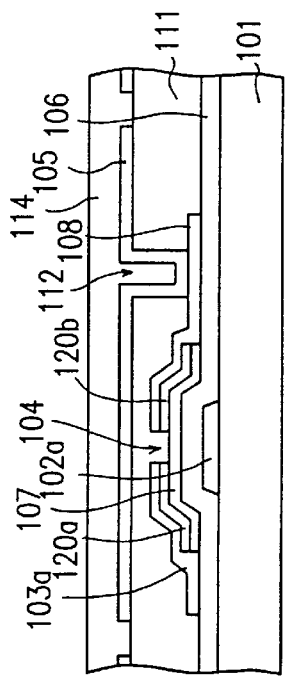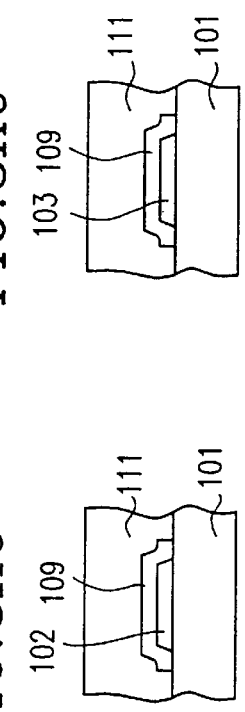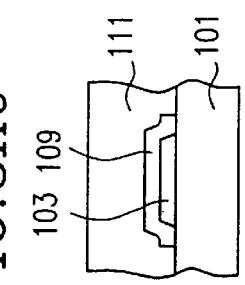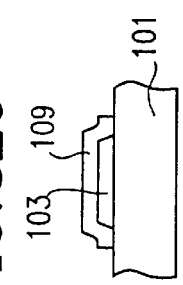

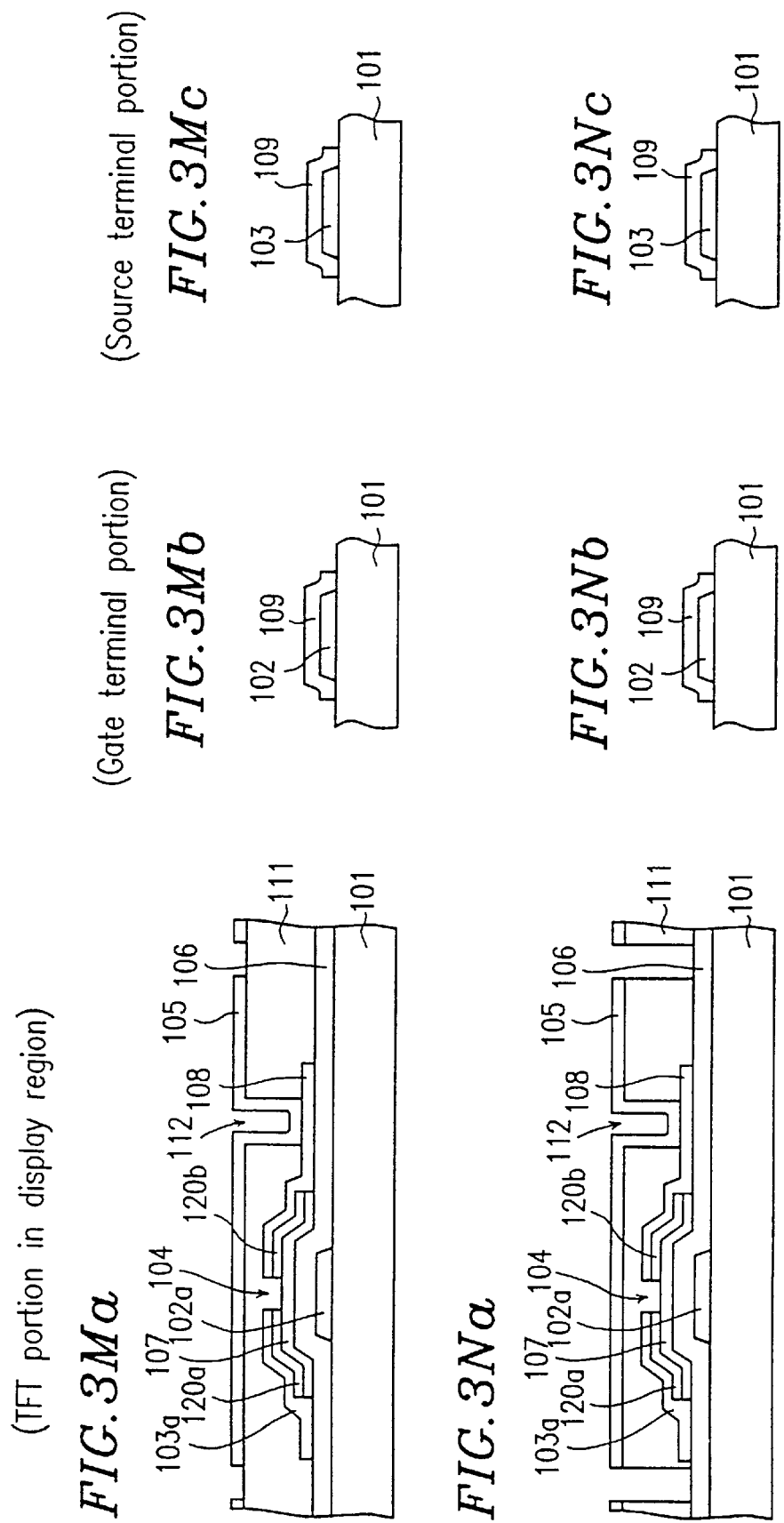

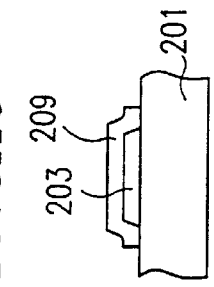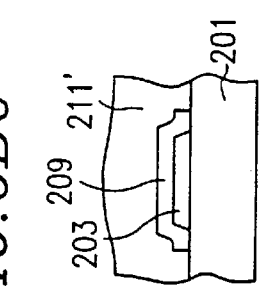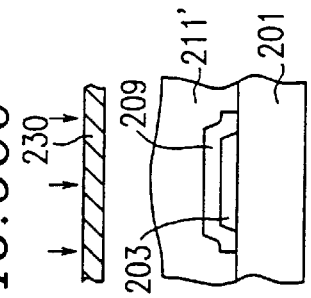
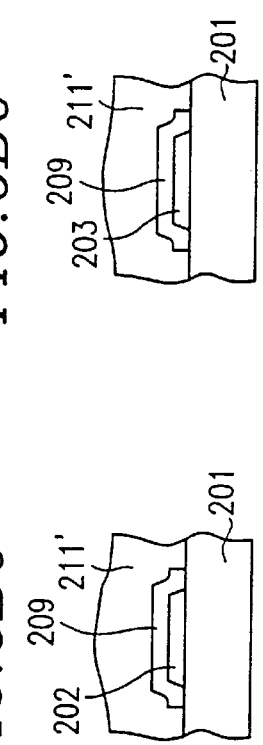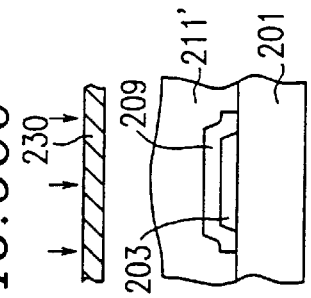
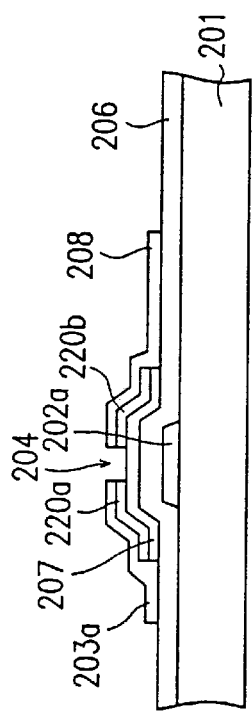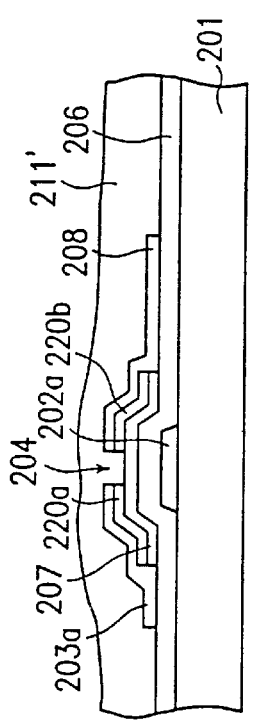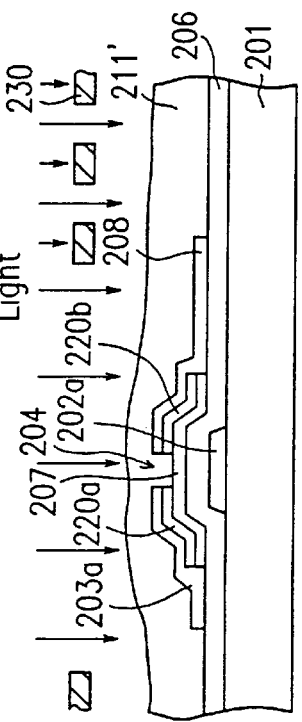

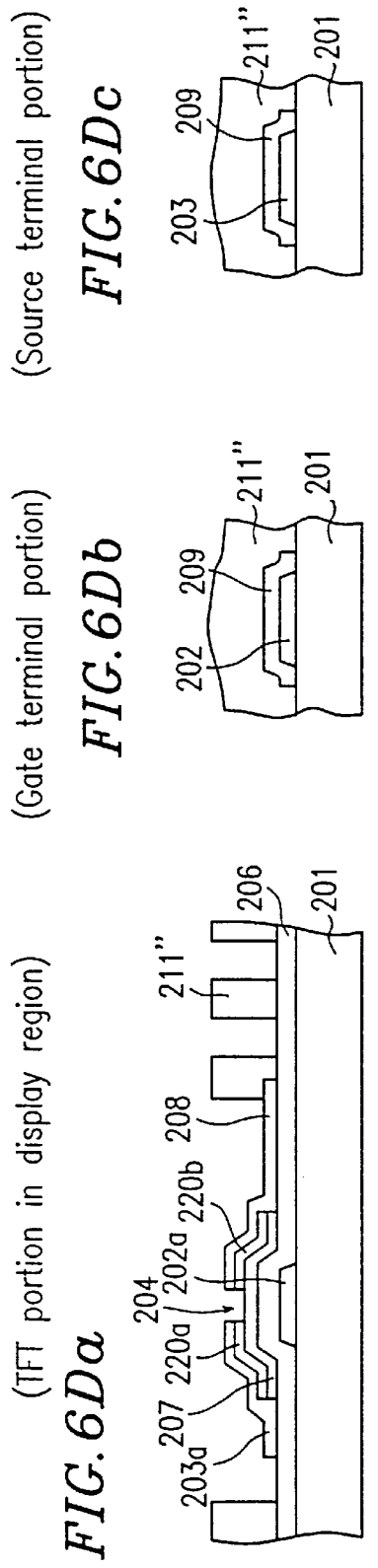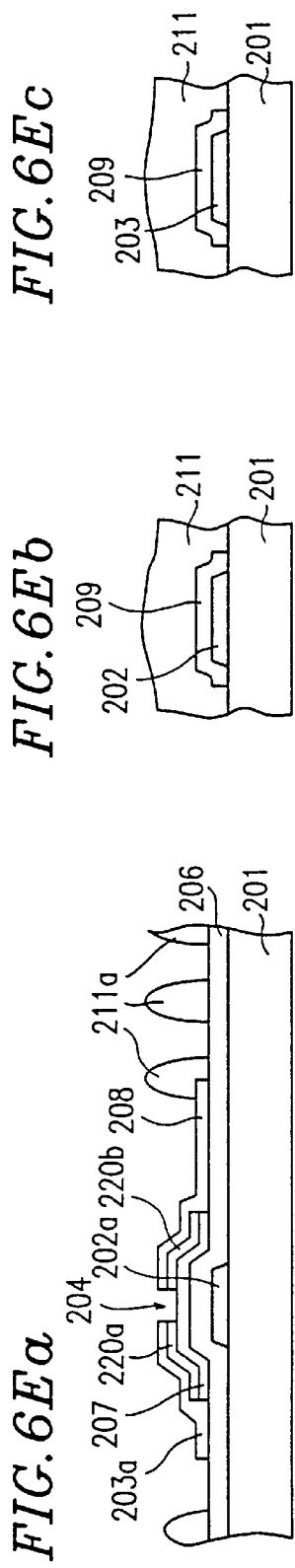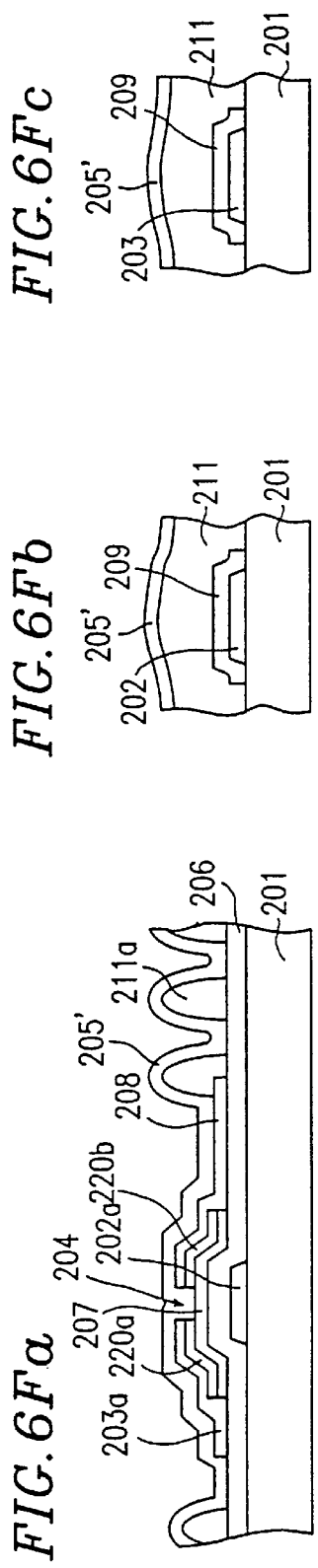

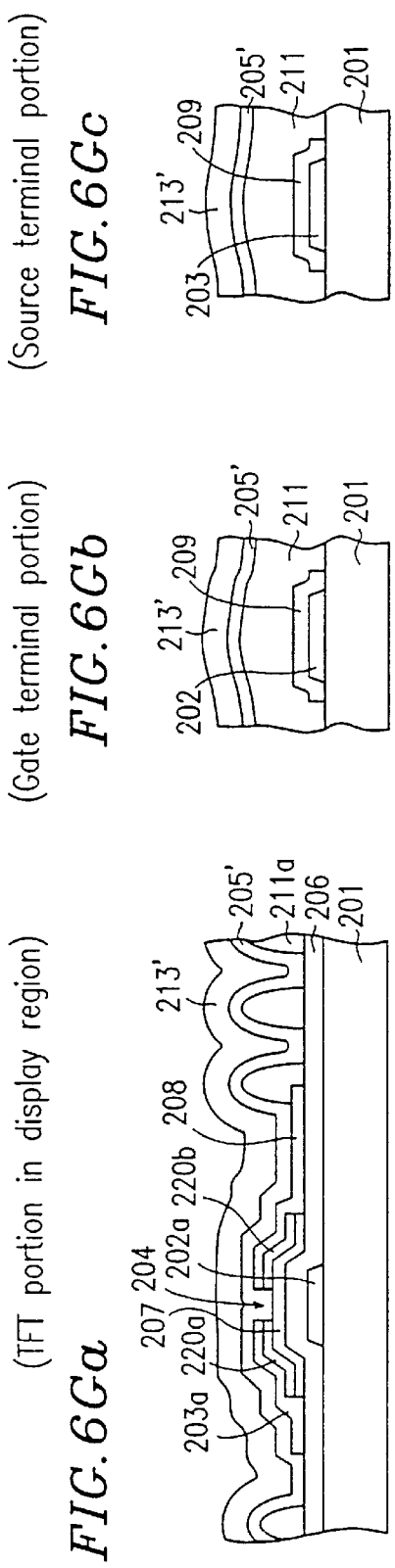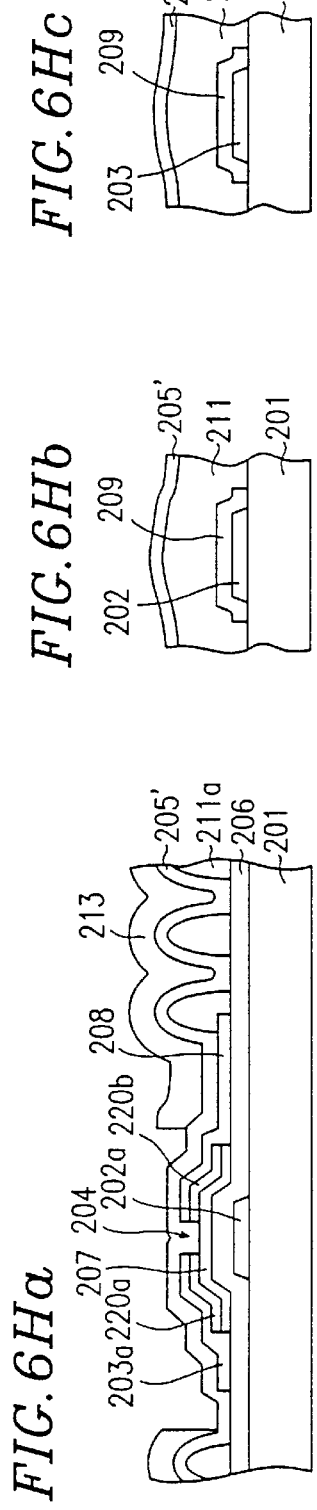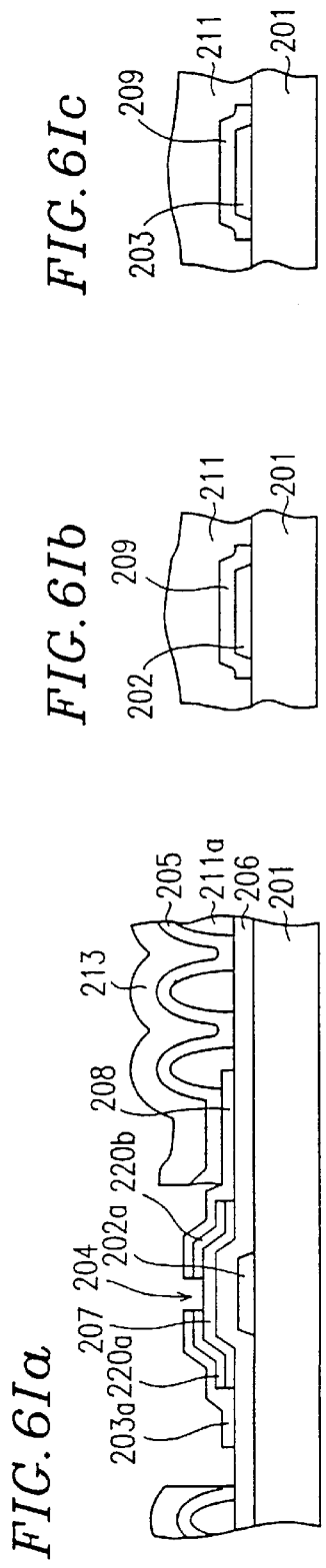

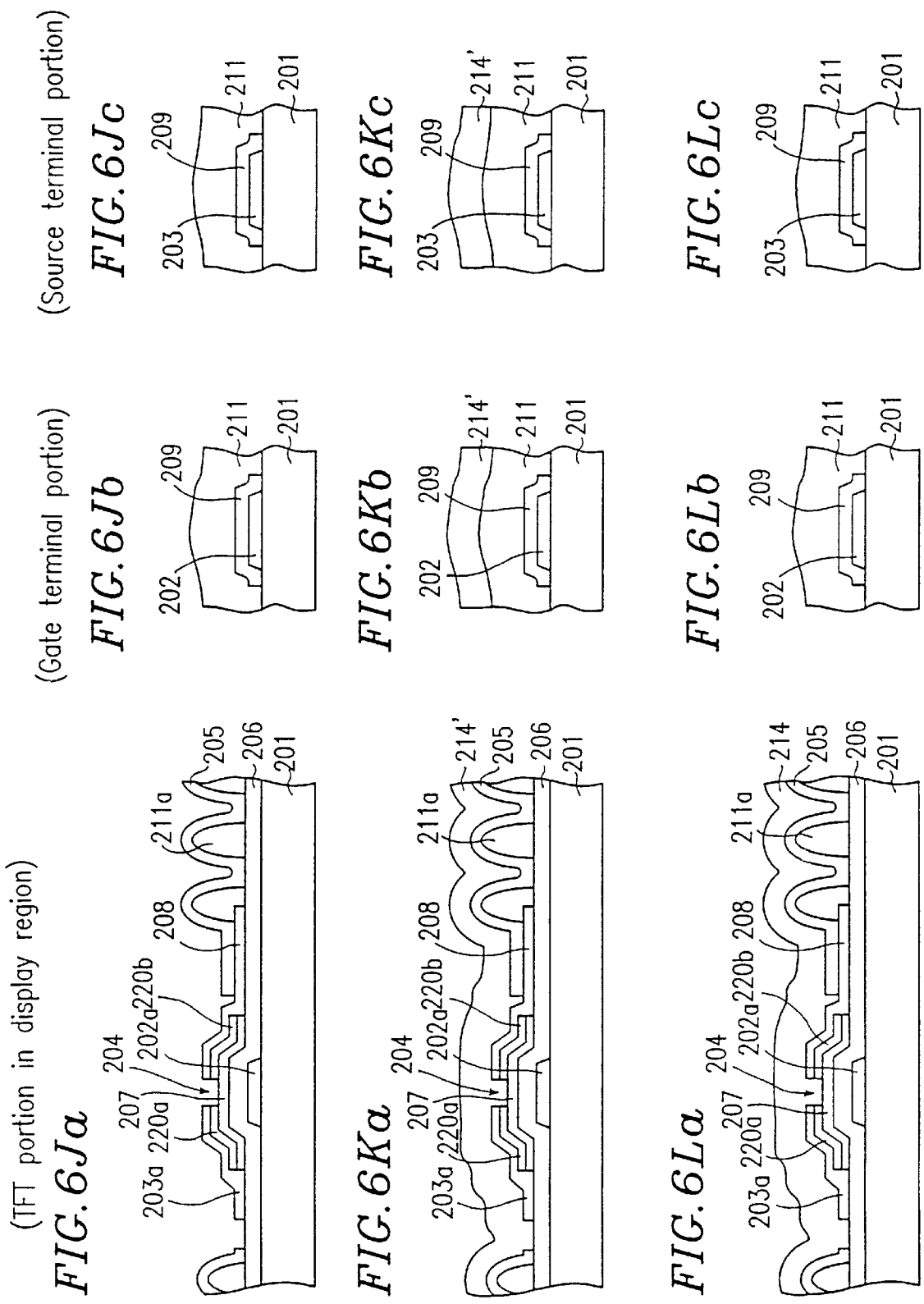

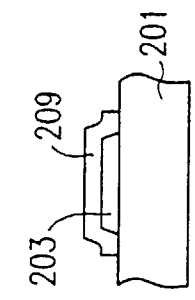
FIG.6Mc (Source terminal portion)
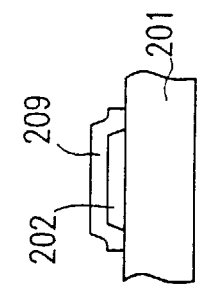
FIG.6Mb (Gate terminal portion)
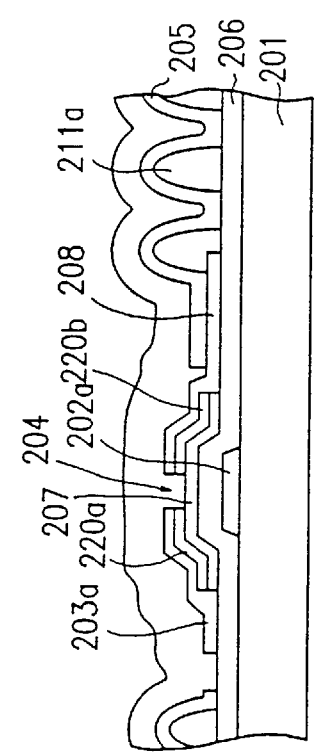
FIG.6Ma (TFT portion in display region)
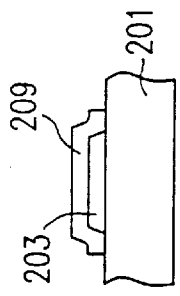
FIG.6Nc
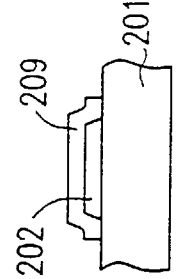
FIG.6Nb
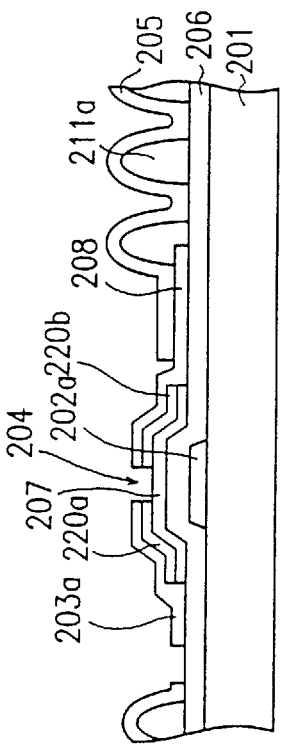
FIG.6Na

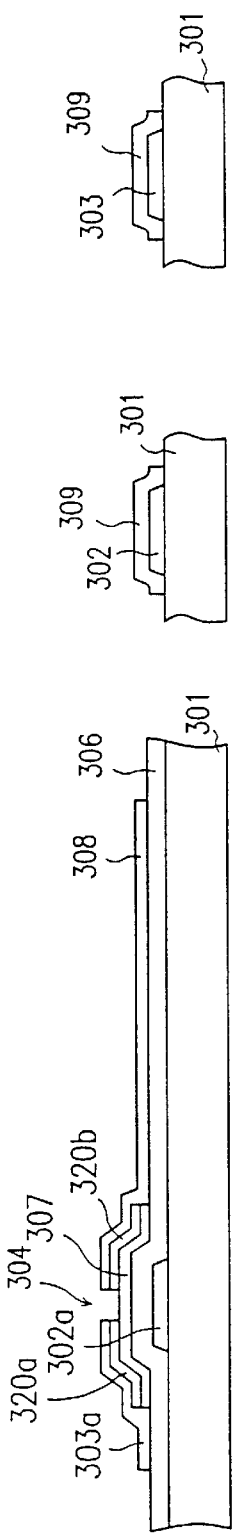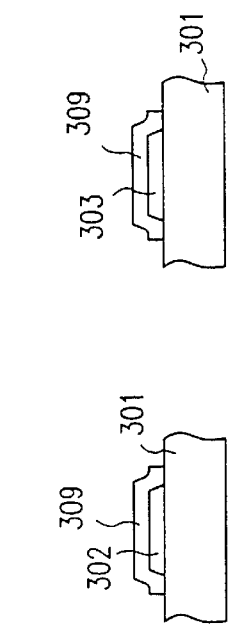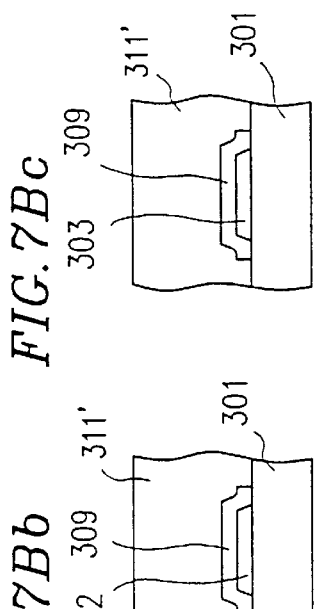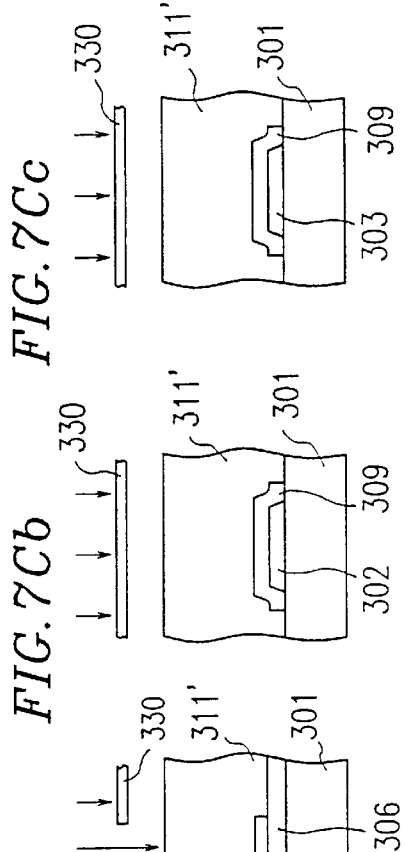

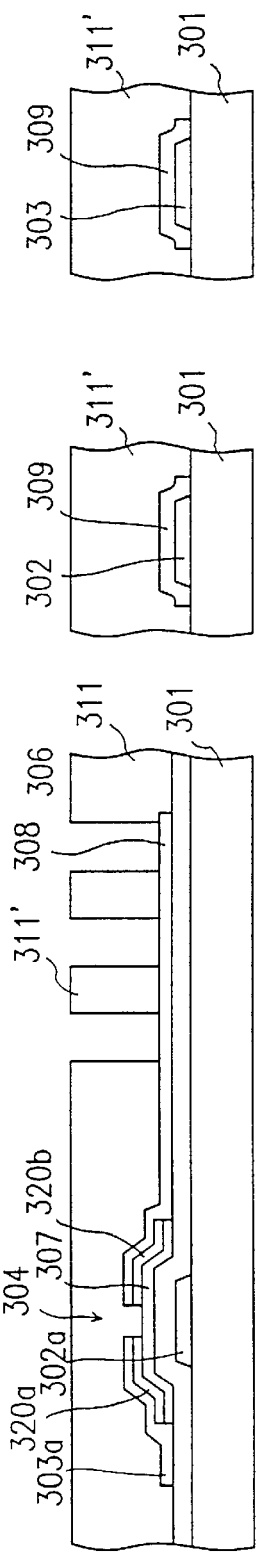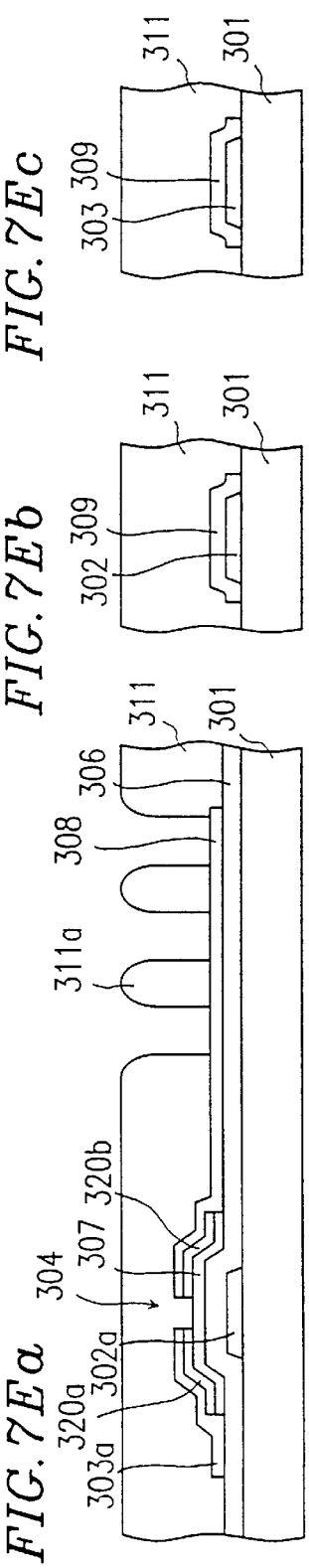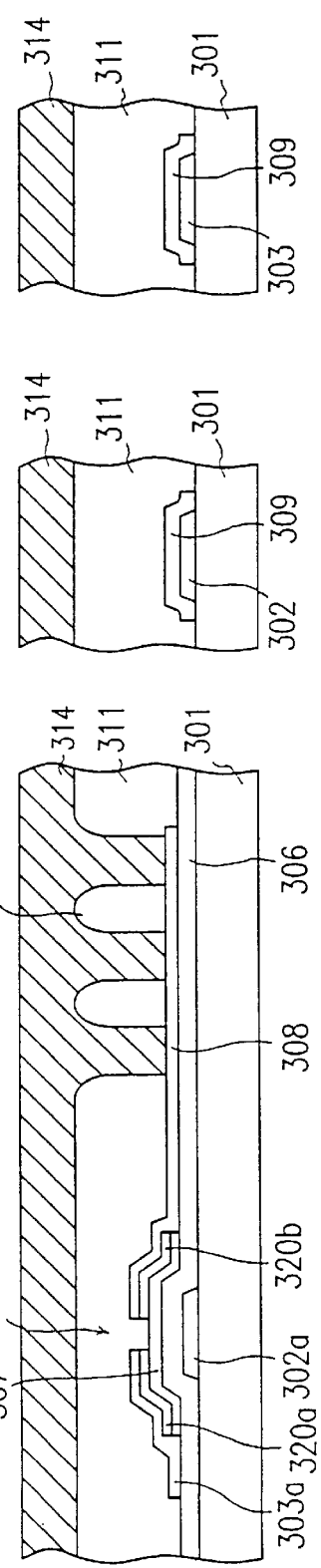

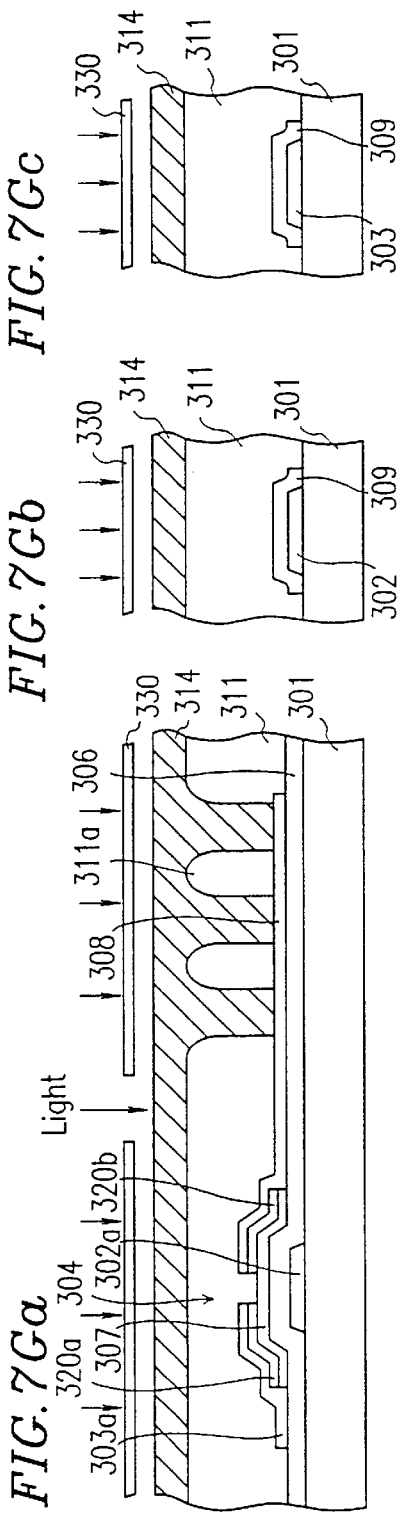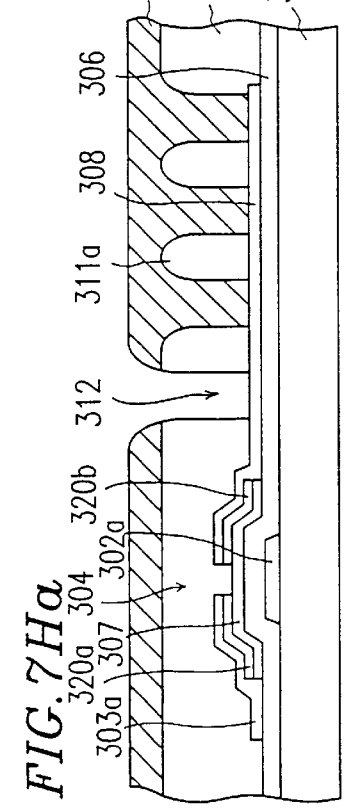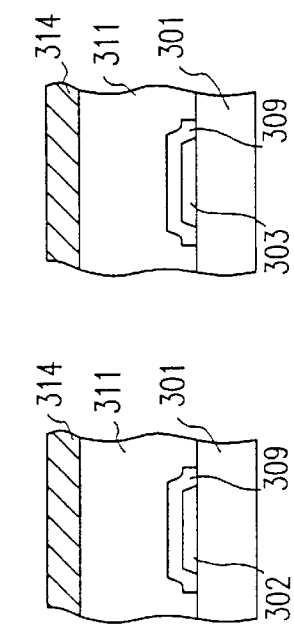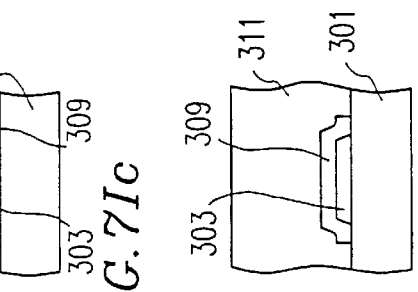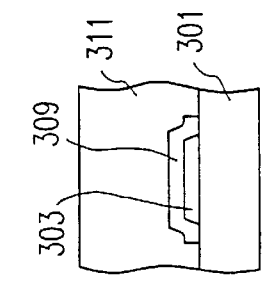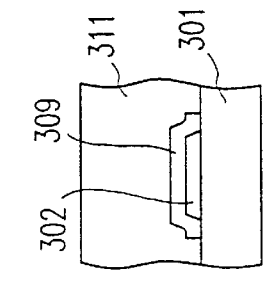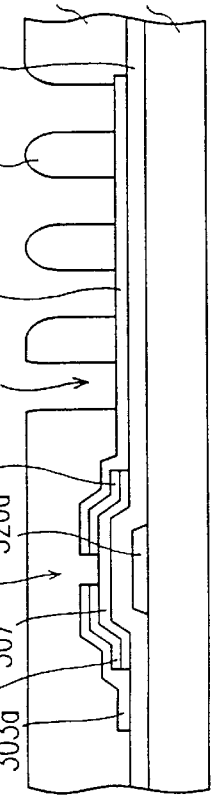

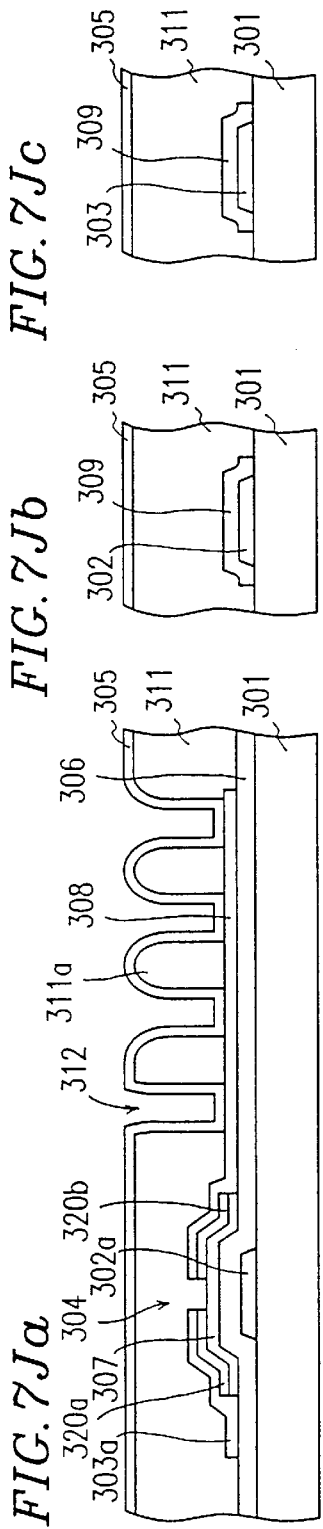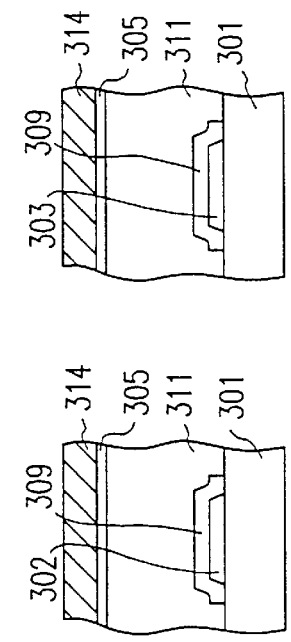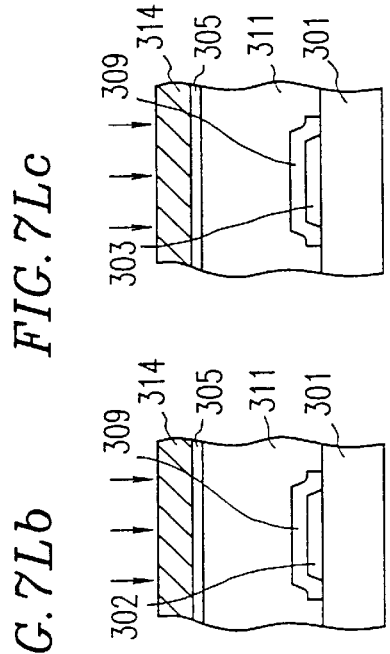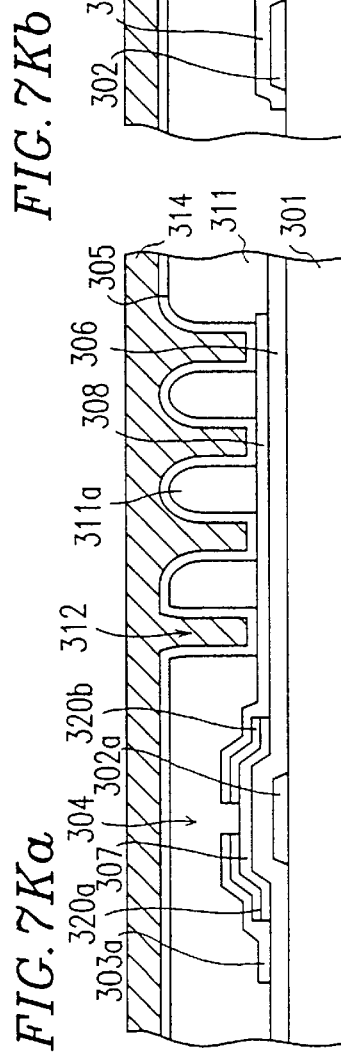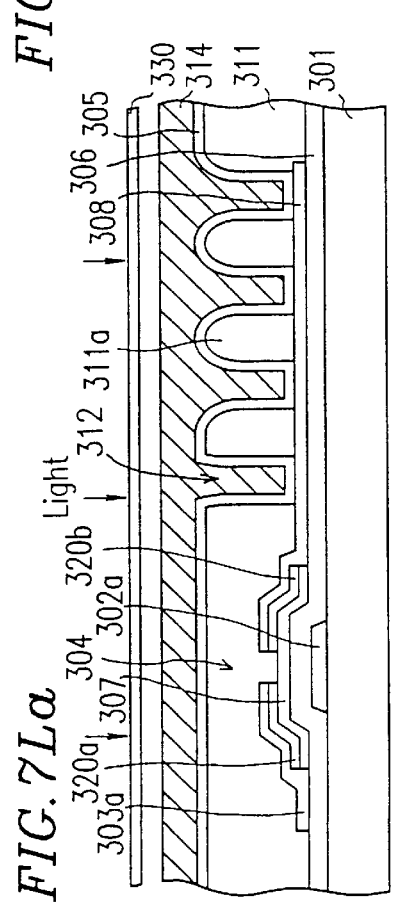

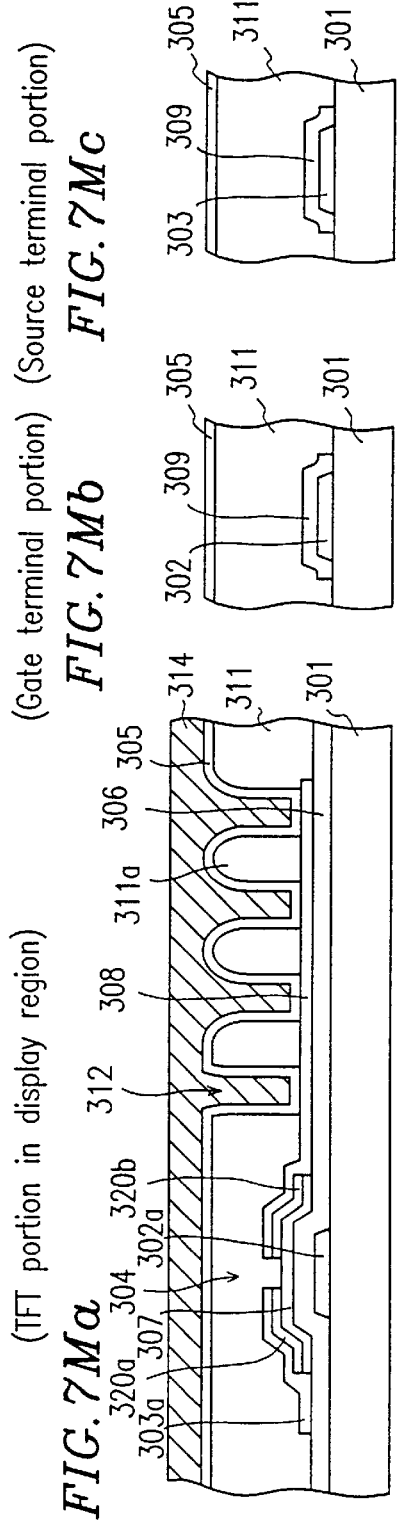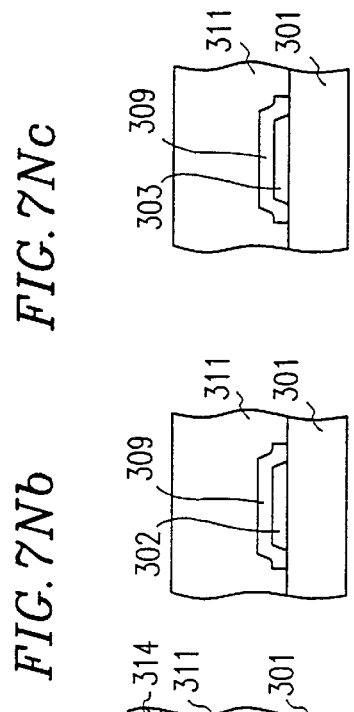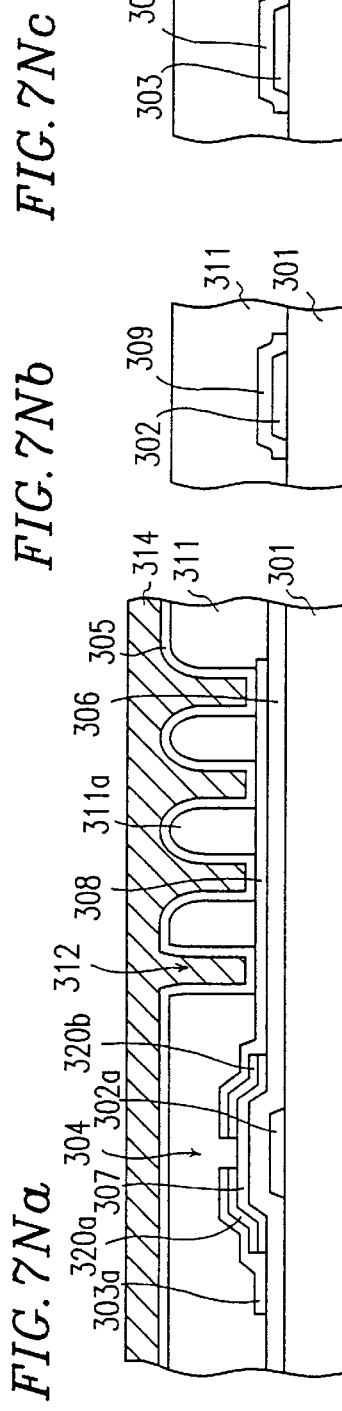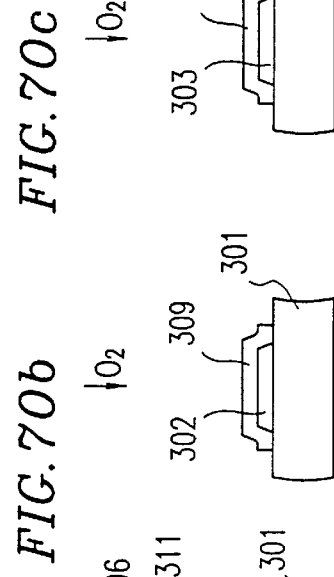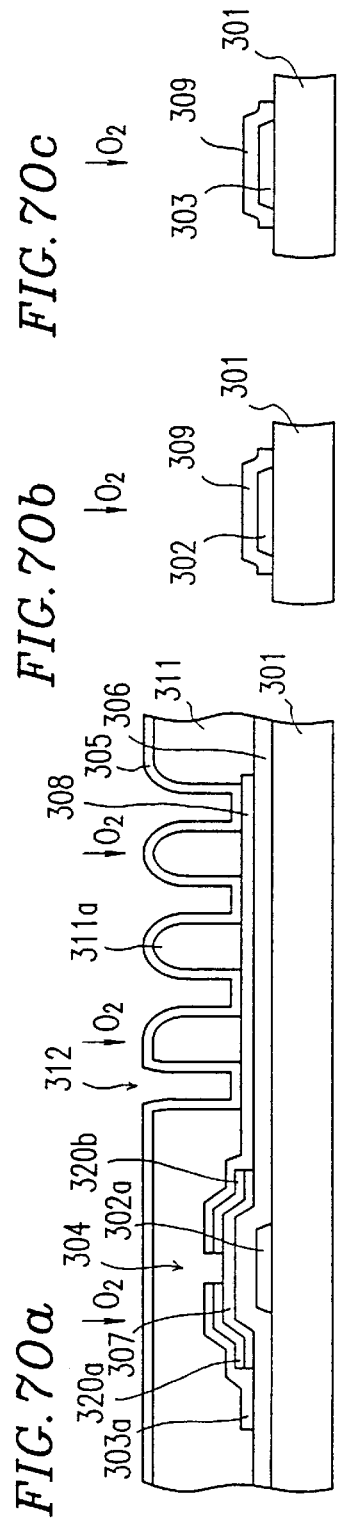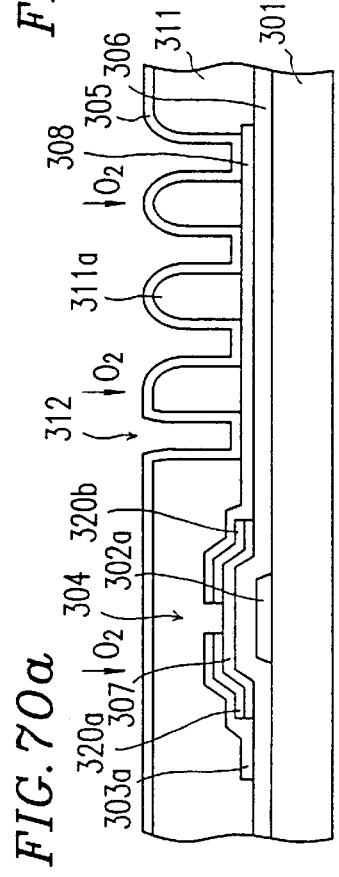

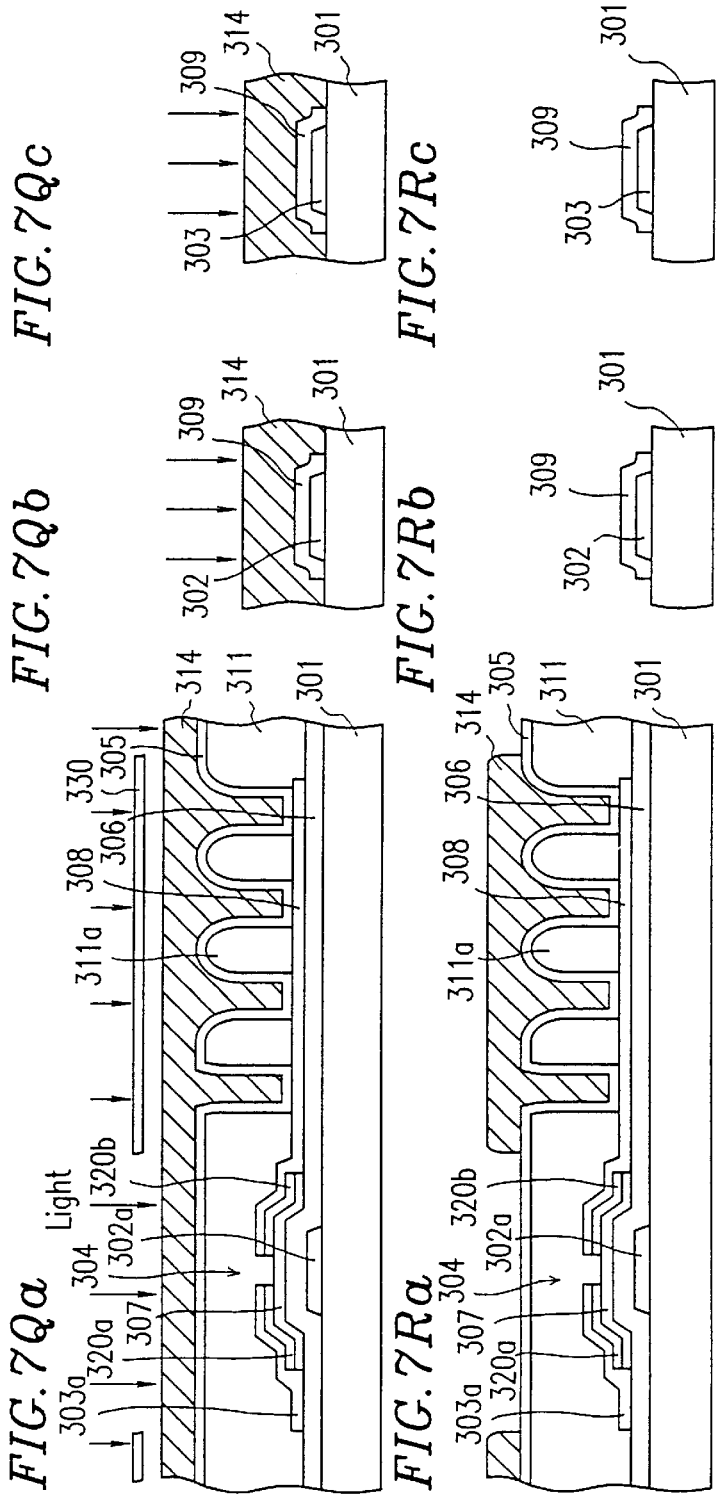

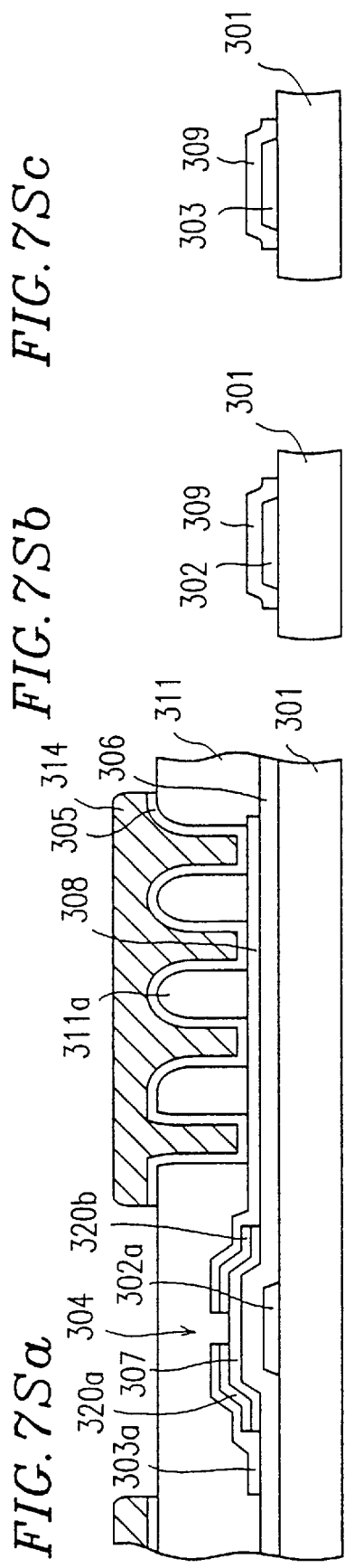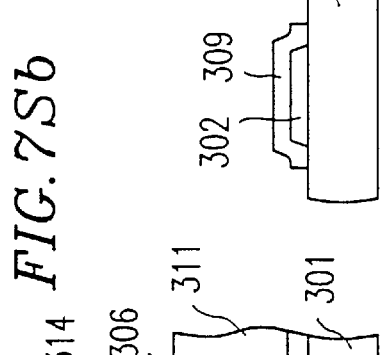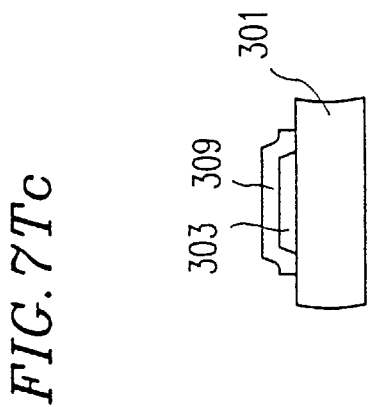

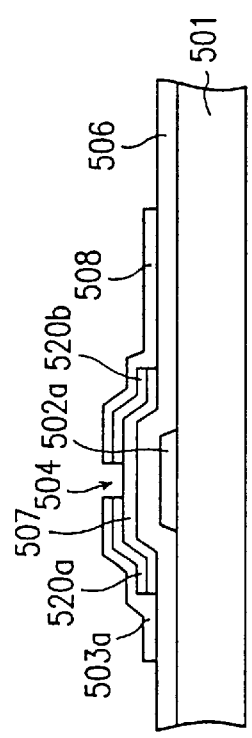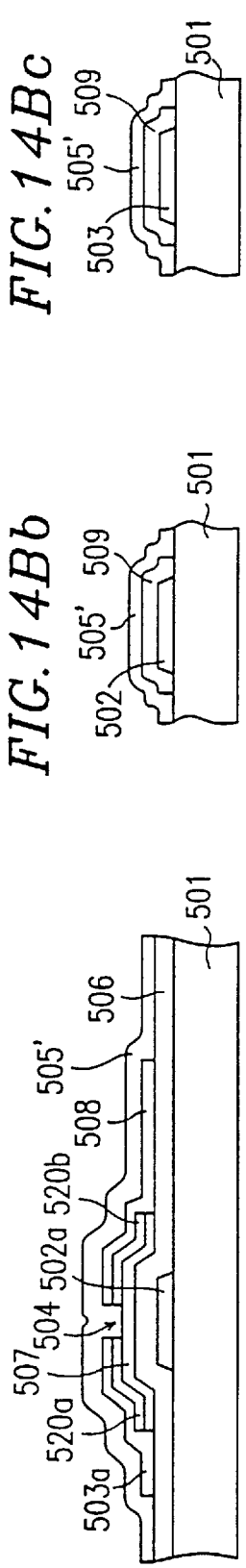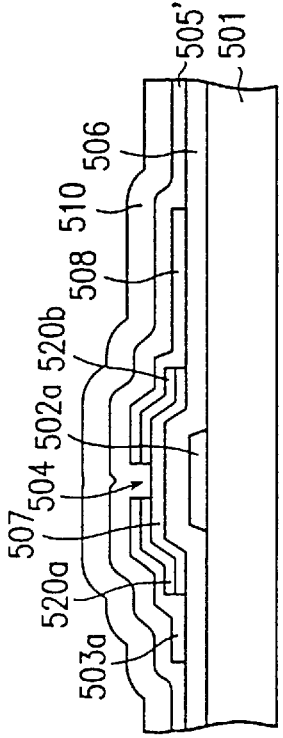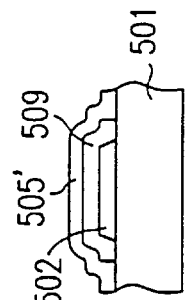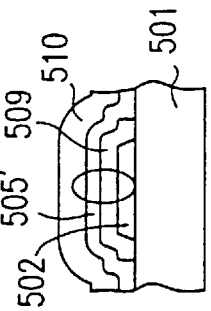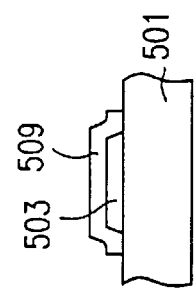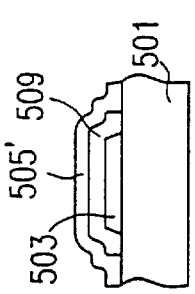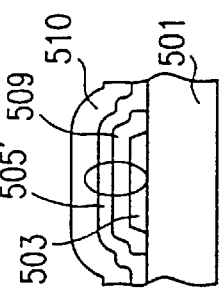

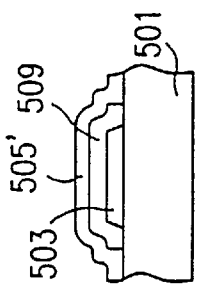
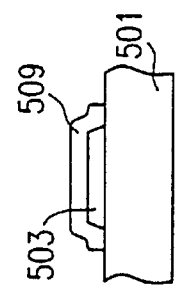
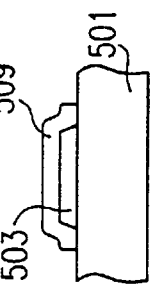
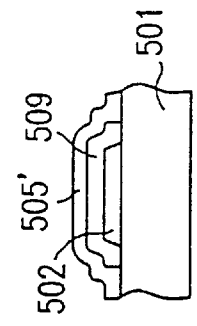
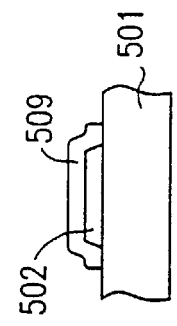
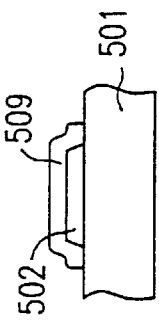
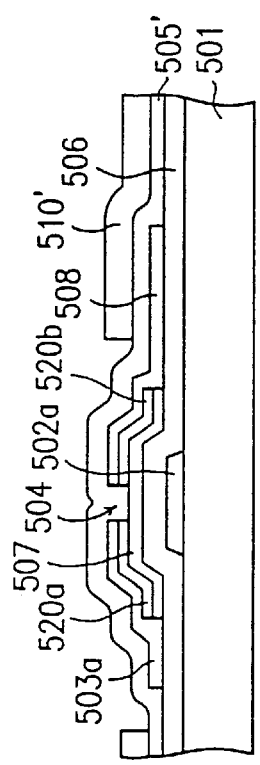
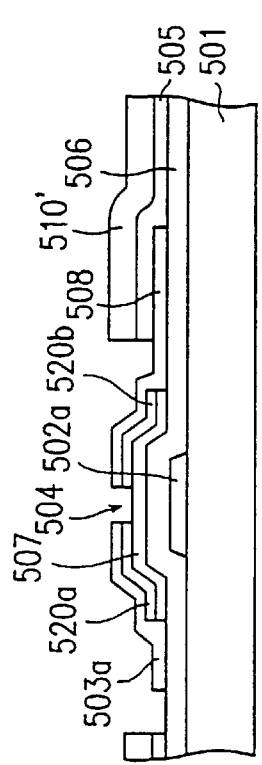
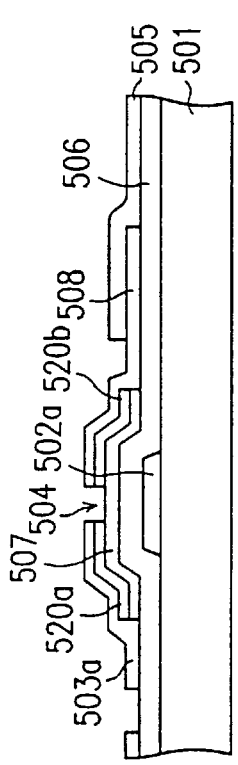

PROCESS FOR MANUFACTURING REFLECTION-TYPE LIQUID CRYSTAL DISPLAY APPARATUS

BACKGROUND OF THE INVENTION

1. Field of the Invention

The present invention relates to a process for manufacturing a reflection-type liquid crystal display apparatus which can be utilized in office automation equipment such as personal computers and the like.

2. Description of the Related Art

In recent years, since office automation equipments such as personal computers and the like have become more and more portable, the reduction in cost of their display apparatus has become an important issue. The display apparatus comprises a pair of oppositely arranged substrates on which electrodes are respectively provided which sandwich a display medium having electrooptical characteristics. A display is generated by applying a voltage to both electrodes. The display media that can be used includes liquid crystals, electroluminesense, plasma, electrochromic, and the like. Among these media, liquid crystal display (LCD) apparatuses are the most common since they are capable of generating a display which consumes a lower amount of power.

Regarding the display mode and driving method of the liquid crystal display apparatus, a simple matrix type including a super twisted nematic (STN) is a class which can most realize the cost reduction. However, because there are demands for display apparatus having higher resolution, higher contrast, multi-gradation (multi-color, full color), wide viewing angle characteristics and the like with information being transferred through multimedia, it would be difficult in the future to fulfill these demands by using a simple matrix type.

An active matrix type has been proposed which comprises a switching element (an active element) on each pixel to increase the number of scanning lines, and according to this type, the display apparatus having improved resolution, contrast, multi-gradation, wide viewing angle characteristics and the like can be obtained. According to this active-matrix type liquid crystal display apparatus, pixel electrodes are provided in a matrix shape on one of a pair of oppositely arranged substrates which sandwich a liquid crystal layer, i.e., an active matrix substrate, while scanning lines are provided passing through the vicinity of the pixel electrodes, both of which are electrically connected via an active element.

The active element is a two-terminal nonlinear element or a three-terminal nonlinear element. Representative active elements that have presently been employed include thin film transistors (TFT) which are three-terminal nonlinear elements.

Furthermore, in recent years, since a demand for lowering the consumed power is increasing, a reflection-type liquid crystal display apparatus has been eagerly developed instead of a transmission-type liquid crystal display apparatus which usually requires a backlight.

It is necessary to increase the strength of a light scattering toward a direction vertical to the display screen with respect to incoming light at any angle in order to achieve a bright display in this reflection-type liquid crystal display apparatus. Thus, it is necessary to manufacture a reflector having optimum reflection characteristics. A process for manufacturing a reflector comprising forming a controlled uneven surface of a substrate made from for example glass, etc., and forming thereon a thin film made from silver, etc., is known in the art. For example, Japanese Laid-open Publication No. 6-75238 (Nakamura et al.) describes forming a plurality of convex portions by applying a photosensitive resin on a substrate, and by exposing and developing the photosensitive resin through a light-shading means having a circle light-shading region arranged thereon. In this publication, an insulating protective film is then formed on the convex portions along with their shape, and a reflector consisting of a metallic thin film is formed on the insulating protective film.

When the reflector is formed outside of the substrate (i.e., the side opposite to the liquid crystal layer), a double image occurs due to the effect of the thickness of the glass substrate, but this problem may be overcome by forming the reflector inside of the glass substrate (i.e., the liquid crystal layer side) so as to use the reflector as a pixel electrode also.

The following illustrates conventional reflection-type liquid crystal display apparatus with reference to the drawings.

FIG. 11 is a plan view showing the structure of an active matrix substrate in conventional reflection-type liquid crystal display apparatus, FIG. 12 is a plan view showing the structure of one pixel portion in the active matrix substrate; FIG. 13A is a plan view showing the structure of a gate terminal portion in the terminal region located outside of the display region (the screen portion) on which a pixel electrode is formed in the active matrix substrate; FIG. 13B is a plan view showing the structure of a source terminal portion; FIGS. 14A*a* to 14F*a* are sectional views illustrating a process for manufacturing the C-C' line sectional portion, i.e., the TFT portion of FIG. 12; FIGS. 14A*b* to 14F*b* are sectional views illustrating a process for manufacturing the D-D' line sectional portion, i.e., the gate terminal portion of FIG. 13A; and FIGS. 14A*c* to 14F*c* are sectional views illustrating a process for manufacturing the E-E' line sectional portion, i.e., the source terminal portion of FIG. 13B.

As shown in FIG. 12, the active matrix substrate comprises a pixel electrode (a reflection electrode) 505 which is formed in a matrix shape on a glass substrate 501 and also used as a reflector, and a gate bus line 502 as a scanning line and a source bus line 503 as a signal line both of which are formed crossing each other while passing through the vicinity of the pixel electrode. A TFT 504 as a switching element is provided in the vicinity of the crossing portion between each gate bus line 502 and each source bus line 503. A gate electrode of the TFT 504 is a portion branching from the gate bus line 502, while a source electrode of the TFT 504 is a portion branching from the source bus line 503, and a drain electrode of the TFT 504 is electrically connected to the reflection electrode 505.

In the TFT portion, a gate electrode 502*a* is formed on the glass substrate 501, and an insulating layer 506 is formed as covering its upper portion, as shown in FIG. 14F*a*. A semiconductor layer 507 is formed thereon as overlapping the gate electrode 502, and contact layers 520*a* and 520*b* are formed as covering a portion of the semiconductor layer 502*a* and being separated from each other by a center portion. A source electrode 503*a* is formed on one contact layer 520*a*, while a drain electrode 508 is formed on the other contact layer 520*b*. A reflection electrode 505 made of Al or the like, is formed partially overlapping the drain electrode 508 of the TFT 504, and electrically connected to the drain electrode 508.

In the gate terminal portion, a connector electrode 509, connected to outside elements, is formed on the gate bus line 502 which is formed on the glass substrate 501, as shown in FIGS. 13A and 14F*b*. Also, in the source terminal portion, a connector electrode 509, connected to outside elements, is formed on the source bus line 503 which is formed on the glass substrate 501, as shown in FIGS. 13B and 14F*c*.

The active matrix substrate can be manufactured for example as described below in the reflection-type liquid crystal display apparatus which also uses the pixel electrode as a reflector. Since the TFT portion can be manufactured in the same manner as that of conventional liquid crystal display apparatus until a TFT 504 as shown in FIG. 14A*a* is formed, and the gate terminal portion and the source terminal portion can also be manufactured in the same manner as that of conventional liquid crystal display apparatus until a connector electrode 509 made of ITO (indium tin oxide), as shown in FIGS. 14A*b* and 14A*c*, is formed on the gate bus line 502 and the source bus line 503, the following illustrates a process for manufacturing them after these steps.

First, a reflection electrode film 505' is formed on the entire surface of a substrate, as shown in FIGS. 14B*a*, 14B*b* and 14B*c*.

Then, a resist is applied on the reflection electrode film 505' to form a resist film 510, as shown in FIGS. 14C*a*, 14C*b* and 14C*c*.

Subsequently, the resist film 510 is exposed and developed using a photolithography technique to form a resist pattern 510' for the formation of a reflection electrode in the TFT portion, as shown in FIG. 14D*a*. At this time, the resist film 510 in the gate terminal portion and the source terminal portion is removed, as shown in FIGS. 14D*b* and 14D*c*.

Thereafter, the reflection electrode film 505' is etched using the resist pattern 510' as a mask to form a reflection electrode 505 in the TFT portion, as shown in FIG. 14E*a*. At this time, the reflection electrode film 505' in the gate terminal portion and the source terminal portion is removed, as shown in FIGS. 14E*b* and 14E*c*.

Then, the substrate is for example immersed into a resist peeling solution to remove the resist pattern 510'.

As described above, the reflection electrode 505 connected to the drain electrode 508 is revealed in the TFT portion as shown in FIG. 14F*a*, while the connector electrode 509 formed on the gate bus line 502 and the source bus line 503 is revealed in the gate terminal portion and the source terminal portion as shown in FIGS. 14F*b* and 14F*c*.

In such a reflection-type liquid crystal display apparatus, the reflection characteristics of the reflection electrode 505 may be optimized by forming a plurality of convex portions and a plurality of concave portions in a portion near which the reflection electrode 505 is formed in order to increase the strength of a light scattering toward a direction vertical to the display screen with respect to incoming light at any angle.

In this case, these convex portions and concave portions may be formed as for example shown in FIGS. 15A to 15D. First, a photosensitive resin 511 is applied onto the surface of a glass substrate 501 which constitutes an active matrix substrate, as shown in FIG. 15A. Then, the photosensitive resin 511 is exposed through a light-shading means 514 (reticle) having a light-shading region 512 and a light-transmitting region 513, as shown in FIG. 15B and thereafter developed to form a photosensitive resin pattern 511', as shown in FIG. 15C. Thereafter, the photosensitive resin pattern 511' is subjected to a heat treatment to form unevennesses 511" having optimum shapes, as shown in FIG. 15D.

The light-shading means 514 that can be used include, for example, those having circular light-shading regions arranged therein as shown in FIG. 16, and those having circular light-transmitting regions arranged therein as shown in FIG. 17.

According to such a conventional reflection-type liquid crystal display apparatus, the reflection electrode film 505' is etched to form the reflection electrode 505 as shown in FIG. 14D*a* in a wet etching procedure using a nitric acid/acetic acid/phosphoric acid/water system as an etchant.

Apparently, it is preferred that a material having a higher reflectivity be used for the reflection electrode. For that reason, Ag is an optimum reflection electrode material, but Ag has a higher diffusion rate and thus may cause problems when Ag diffuses into and reacts with a base substrate.

On the other hand, because Al, which is less likely to diffuse into and react with a base substrate, has been widely used for the metallization of integrated circuits with good characteristics such as etching conditions and the like, Al is often used as a material for the reflection electrode.

In this case, a reflection electrode film 505' made of Al is formed and etched on a connector electrode 509 made of ITO in the gate terminal portion and the source terminal portion, as shown in FIGS. 14D*b* and 14D*c*.

Since a thin film has an extraordinary number of lattice defects compared to a bulk-state material and includes imperfect crystals, there are a number of pinholes produced in the reflection electrode film.

For example, as shown in FIG. 18 which is an enlarged sectional view of the circled portions in FIGS. 14C*b* and 14C*c*, a number of pinholes are produced in the reflection electrode film 505' formed on the connector electrode 509 made of ITO which is located on the gate bus line 502 and the source bus line 503.

When the resist film 510 is exposed and developed under the above-described condition, the developer would be in contact with the reflection electrode film 505' as well as the connector electrode 509 through these pinholes 515.

In a case where the reflection electrode film 505' is made of Al and the connector electrode 509 is made of ITO as described above, the developer would be interposed between the reflection electrode and the connector electrode to provide a cell effect, which leads to a reaction between Al and ITO causing corrosion and dissolution between them. This would certainly reduce the yield of the TFT, i.e., the reflection-type liquid crystal display apparatus.

As described above, there is a demand for a process for manufacturing a reflection-type liquid crystal display apparatus which is capable of preventing the corrosion and dissolution caused by a cell effect between the connector electrode and the reflection electrode film at the time of patterning the reflection electrode film, and thus improving the yield thereof.

SUMMARY OF THE INVENTION

The present invention provides a process for manufacturing a reflection-type liquid crystal display apparatus. The reflection-type liquid crystal display apparatus comprising a pair of oppositely arranged substrates a liquid crystal layer interposed therebetween, and on one of said substrates, a plurality of pixel electrodes with a reflective function formed in a matrix shape, a plurality of scanning lines and a plurality of signal lines crossing each other while passing through the vicinity of said pixel electrode, a thin film transistor provided in the vicinity of the crossing portion between each scanning line and each signal line and connected to said pixel electrode, and a connector electrode on the terminal portion of each scanning line and each signal line located outside of the display region. The method includes the steps of: forming said scanning lines, said signal lines, said thin film transistor and said connector electrode on said substrate; forming a photosensitive resin film covering at least said connector electrode, and forming a reflection electrode film on said photosensitive resin film and other portions; removing a portion of said reflection electrode film located at least on said connector electrode, and patterning said reflection electrode film so that said pixel electrode resides in said display region; and removing a portion of said photosensitive resin film located on said connector electrode to reveal said connector electrode.

In one embodiment of the invention, the method includes forming said photosensitive resin film covering said connector electrode and being located at least under said pixel electrode, forming a contact hole in said photosensitive resin film, and forming said pixel electrode as electrically connecting to the drain electrode of said thin film transistor through said contact hole.

In another embodiment of the invention, the method includes forming said photosensitive resin film in a portion where said pixel electrode is formed, forming a plurality of convex portions and a plurality of concave portions from said photosensitive resin film, and forming said pixel electrode as covering said convex portions and said concave portions.

In still another embodiment of the invention, the connector electrode is made from ITO, and said pixel electrode is made from Al.

In still another embodiment of the invention, the step of revealing said connector electrode is carried out by an ashing in an $O_2$ plasma or an $O_2$ plasma containing $CF_4$.

In still another embodiment of the invention, the steps of patterning said reflection electrode film and revealing said connector electrode include: patterning said reflection electrode film in a state that said pixel electrode is continuous in said display region; removing a portion of said photosensitive resin film located on said connector electrode by ashing to reveal said connector electrode; and patterning said reflection electrode film so as to separate said continuous pixel electrode.

In still another embodiment of the invention, the steps of patterning said reflection electrode film and revealing said connector electrode include: patterning said reflection electrode film in a state that said pixel electrode is continuous in said display region and extended over the outside of said display region; removing a portion of said photosensitive resin film located on said connector electrode by ashing to reveal said connector electrode; and patterning said reflection electrode film so as to separate said continuous pixel electrode and remove a portion of said pixel electrode located outside of said display region.

Thus, the invention described herein makes possible the advantage of providing a process for manufacturing a reflection-type liquid crystal display apparatus which is capable of preventing the corrosion and dissolution caused by a cell effect between the connector electrode and the reflection electrode film at the time of patterning the reflection electrode film, and thus improving the yield thereof.

These and other advantages of the present invention will become apparent to those skilled in the art upon reading and understanding the following detailed description with reference to the accompanying figures.

BRIEF DESCRIPTION OF THE DRAWINGS

FIGS. 3A$a$ to 3N$a$, FIGS. 3A$b$ to 3N$b$, and FIGS. 3A$c$ to 3N$c$ are sectional views illustrating a process for manufacturing the reflection-type liquid crystal display apparatus according to Embodiment 1, wherein the capital letters A to N in these figures represent an order of the manufacturing process; the small letter a represents a process for manufacturing the TFT portion of the substrate; the small letter b represents a process for manufacturing the gate terminal portion of the substrate; and the small letter c represents a process for manufacturing the source terminal portion of the substrate;

FIGS. 6A$a$ to 6N$a$, FIGS. 6A$b$ to 6N$b$, and FIGS. 6A$c$ to 6N$c$ are sectional views illustrating a process for manufacturing the reflection-type liquid crystal display apparatus according to Embodiment 2, wherein the capital letters A to N in these figures represent the order of the manufacturing process; the small letter a represents a process for manufacturing the TFT portion of the substrate; the small letter b represents a process for manufacturing the gate terminal portion of the substrate; and the small letter c represents a process for manufacturing the source terminal portion of the substrate;

FIGS. 7A$a$ to 7T$a$, FIGS. 7A$b$ to 7T$b$, and FIGS. 7A$c$ to 7T$c$ are sectional views illustrating a process for manufacturing the reflection-type liquid crystal display apparatus according to Embodiment 3, wherein the capital letters A to T in these figures represent an order of the manufacturing process; the small letter a represents a process for manufacturing the TFT portion of the substrate; the small letter b represents a process for manufacturing the gate terminal portion of the substrate; and the small letter c represents a process for manufacturing the source terminal portion of the substrate;

FIGS. 14A$a$ to 14F$a$, FIGS. 14A$b$ to 14F$b$, and FIGS. 14A$c$ to 14F$c$ are sectional views illustrating a process for manufacturing conventional reflection-type liquid crystal display apparatus, wherein the capital letters A to F in these figures represent an order of the manufacturing process; the small letter a represents a process for manufacturing the TFT portion of the substrate; the small letter b represents a process for manufacturing the gate terminal portion of the substrate; and the small letter c represents a process for manufacturing the source terminal portion of the substrate;

DESCRIPTION OF THE PREFERRED EMBODIMENTS

The following illustrates the embodiments of the present invention with reference to the drawings.

Embodiment 1

Figure 1:
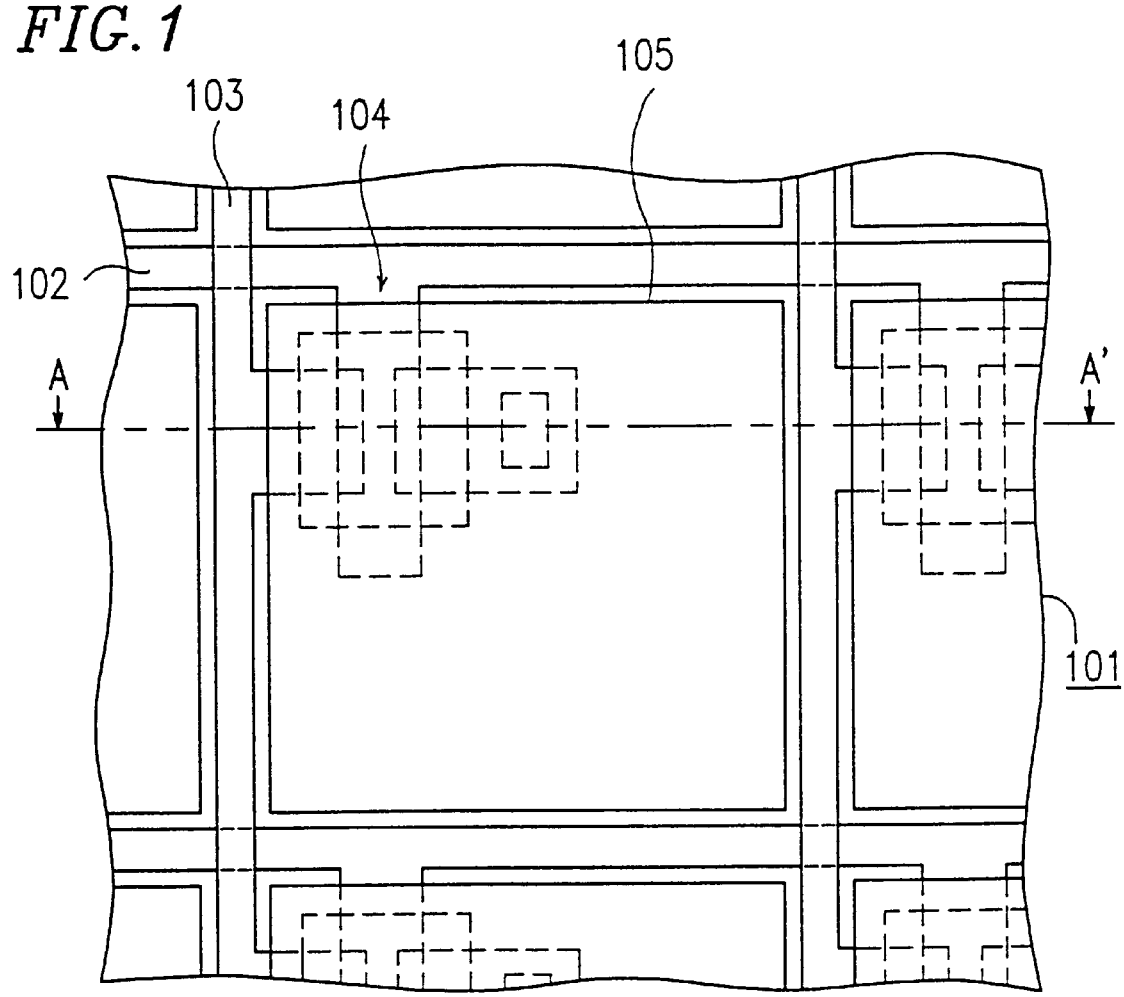
FIG. 1 is a plan view showing the structure of one pixel potion of an active matrix substrate in the reflection-type liquid crystal display apparatus according to Embodiment 1 of the present invention.
Figure 2:
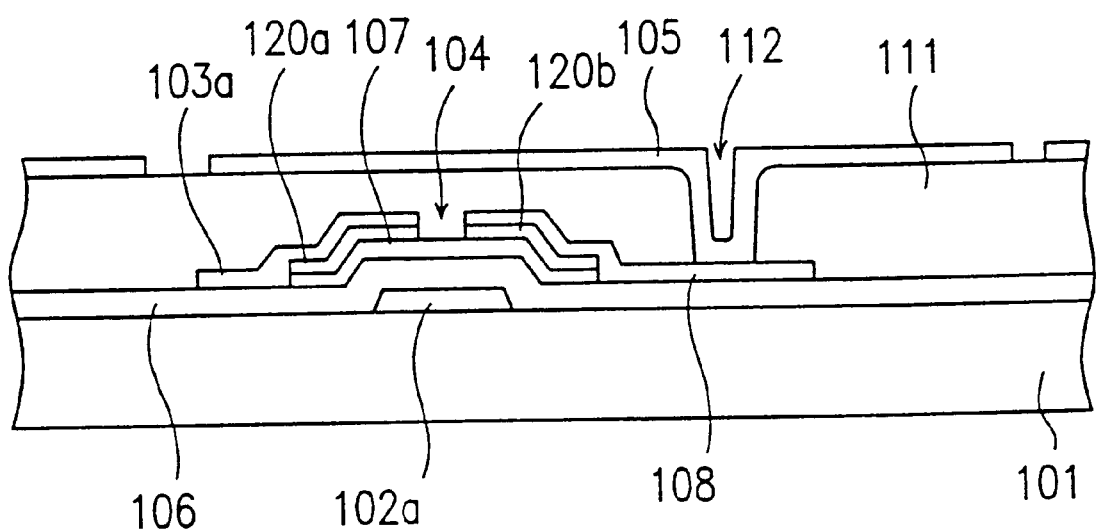
FIG. 2 is a sectional view showing the A-A' line sectional portion of FIG. 1.

FIG. 1 is a plan view showing the structure of one pixel potion of the active matrix substrate in the reflection-type liquid crystal display apparatus according to Embodiment 1, FIG. 2 is a sectional view showing the A-A' line sectional portion of FIG. 1, i.e., the structure of the TFT portion. Also, FIGS. 3Aa to 3Na are sectional views illustrating a process for manufacturing the TFT portion, FIGS. 3Ab to 3Nb are sectional views illustrating a process for manufacturing the gate terminal portion located outside of the display region on which a pixel electrode is formed in the active matrix substrate, and FIGS. 3Ac to 3Nc are sectional views illustrating a process for manufacturing the source terminal portion located outside of the display region in the active matrix substrate.

As shown in FIG. 1, the active matrix substrate comprises a pixel electrode (a reflection electrode) 105 which is formed in a matrix shape on a glass substrate 101 and also used as a reflector, and a gate bus line 102 as a scanning line and a source bus line 103 as a signal line both of which are formed crossing each other while passing through the vicinity of the pixel electrode. A TFT 104 as a switching element is formed in the vicinity of the crossing portion between each gate bus line 102 and each source bus line 103. A gate electrode of the TFT 104 is a portion branching from the gate bus line 102, while a source electrode of the TFT 104 is a portion branching from the source bus line 103, and a drain electrode of the TFT 104 is connected to the reflection electrode 105. The reflection electrode 105 is formed overlapping the TFT 104, a portion of the gate bus line and a portion of the source bus line through the insulating protective film for accomplishing a higher aperture ratio in the display region.

In the TFT portion, a gate electrode 102a is formed on the glass substrate 101, and an insulator layer 106 is formed as covering its upper portion, as shown in FIG. 2. A semiconductor layer 107 is formed thereon as overlapping the gate electrode 102a, and contact layers 120a and 120b are formed as covering a portion of the semiconductor layer 107 and being separated from each other by the center portion. A source electrode 103a is formed on one contact layer 120a, while a drain electrode 108 is formed on the other contact layer 120b. A photosensitive resin film 111 is formed covering the TFT 104, a portion of the gate bus line 102 and a portion of the source bus line 103, and used as an insulating protective film for accomplishing a higher aperture ratio. A reflection electrode 105 made of Al or the like, is formed overlapping the TFT 104, a portion of the gate bus line 102 and a portion of the source bus line 103 through the photosensitive resin film 111, and electrically connected to the drain electrode 108 through the contact hole 112 of the photosensitive resin film 111 which is formed on the drain electrode of the TFT 104.

In the gate terminal portion, a connector electrode 109 connected to outside elements is formed on the gate bus line 102 which is formed on the glass substrate 101, as shown in FIG. 3Mb. Also, in the source terminal portion, a connector electrode 109 connected to outside elements is formed on the source bus line 103 which is formed on the glass substrate 101, as shown in FIG. 3Mc.

The active matrix substrate can be manufactured, for example, as described below. Since the display region (the TFT portion) can be manufactured in the same manner as that of conventional liquid crystal display apparatus until a TFT 104 as shown in FIG. 3Aa is formed and, also the gate terminal portion and the source terminal portion can be manufactured in the same manner as that of conventional liquid crystal display apparatus until a connector electrode 109 made of ITO as shown FIGS. 3Ab and 3Ac is formed on the gate bus line 102 and the source bus line 103, the following illustrates a process for manufacturing the TFT portion, the gate terminal portion and the source terminal portion after these steps.

First, a photosensitive resin film 111' which is an insulating protective film covering a TFT 104, a portion of a gate bus line 102 and a portion of a source bus line 103 in the later steps is applied to a substrate, as shown in FIGS. 3Ba, 3Bb and 3Bc.

Then, the photosensitive resin film 111' is exposed through a photomask 130 having a light-transmitting portion corresponding to a contact hole 112 portion as shown in FIGS. 3Ca, 3Cb and 3Cc, and developed and baked to form the contact hole 112 on a drain electrode 108, as shown in FIG. 3Da. At this time, the photosensitive resin film 111 is left on the connector electrode 109 of the gate terminal portion and the source terminal portion, as shown in FIGS. 3Db and 3Dc. In addition, the photosensitive resin film 111' used herein is of a positive type, and thus the portion of the photosensitive resin film 111' which is irradiated with light is removed by the exposure and development. If the photosensitive resin film 111' is of a negative type, the portion of the photosensitive resin film 111' which is not irradiated with light would be removed.

Subsequently, a reflection electrode film 105' made of Al or the like is formed on the entire surface of the substrate as covering the photosensitive resin film 111 having the contact hole 112 formed thereon, as shown in FIG. 3Ea. At this time, the connector electrode 109 is covered with the photosensitive resin film 111 in the gate terminal portion and the source terminal portion, and thus the reflection electrode film 105' formed thereon is not in contact with the connector electrode 109, as shown in FIGS. 3Eb and 3Ec.

Thereafter, a resist is applied onto the reflection electrode film 105' by a spin coating technique to form a resist film 113', as shown in FIGS. 3Fa, 3Fb and 3Fc.

Then, the resist film 113' is exposed and developed using a photolithography technique to form a resist pattern 113 for the formation of a reflection electrode in the display region, as shown in FIG. 3Ga. At this time, the resist film 113' is removed in the gate terminal portion and the source terminal portion, as shown in FIGS. 3Gb and 3Gc.

Subsequently, the reflection electrode film 105' is etched using the resist pattern 113 as a mask to form a reflection electrode 105 overlapping the TFT 104, a portion of the gate bus line and a portion of the source bus line through the photosensitive resin film 111, as shown in FIG. 3Ha. At this time, the reflection electrode film 105' in the gate terminal portion and the source terminal portion is removed, as shown in FIGS. 3Hb and 3Hc.

Thereafter, the substrate is, for example, immersed into a resist peeling solution to remove the resist pattern 113, as shown in FIG. 3Ia.

Then, a resist is applied onto the entire surface of the substrate, on which the reflection electrode film 105 is formed, by a spin coating technique to form a resist film 114', as shown in FIGS. 3Ja, 3Jb and 3Jc.

Subsequently, the resist film 114' is exposed and developed using a photolithography technique to remove the resist film 114' in the gate terminal portion and the source terminal portion, thereby revealing the photosensitive resin film 111 formed on the connector electrode 109, as shown in FIGS. 3Kb and 3Kc. At this time, the resist pattern 114 is left in the display region, as shown in FIG. 3Ka.

Thereafter, the photosensitive resin film 111 is etched using the resist pattern 114 as a mask to remove the photosensitive resin film 111 in the gate terminal portion and the source terminal portion and reveal the connector electrode 109, as shown in FIGS. 3Lb and 3Lc. At this time, since the resist pattern 114 is left in the display region, the photosensitive resin film 111 is not removed in the display region, as shown in FIG. 3La.

Then, the substrate is for example immersed into a resist peeling solution to remove the resist pattern 114, as shown in FIG. 3Ma.

The active matrix substrate thus manufactured is attached to a counter substrate having a counter electrode formed thereon, and liquid crystal is interposed between both substrates to provide a reflection-type liquid crystal display apparatus.

No corrosion or dissolution caused by a cell effect was observed the connector electrode 109 and the reflection electrode 105 in the reflection-type liquid crystal display apparatus of this embodiment thus actually obtained. This is because the connector electrode 109 is covered with the photosensitive resin film 111 in the gate terminal portion and the source terminal portion during exposing and developing the resist film using a photolithography technique, at the time of patterning the reflection electrode film 105' to form the reflection electrode 105.

Also, since the photosensitive resin film 111 is formed in the display region covering the TFT 104, a portion of the gate bus line 102 and a portion of the source bus line 103, it can function as an insulating protective film which protects the TFT 104, a portion of the gate bus line 102 and a portion of the source bus line 103. Moreover, since the reflection electrode 105 is formed thereon to overlap the TFT 104, a portion of the gate bus line 102 and a portion of the source bus line 103, a higher aperture ratio can be achieved.

According to this embodiment, the resist 114 is left in the display region, when the photosensitive resin film 111 in the gate terminal portion and the source terminal portion is removed to reveal the connector electrode 109. This is not only to prevent any adverse effect on the reflection electrode 105, but also to prevent the portion of the photosensitive resin film 111 not covered with the reflection electrode 105 in the display region from being removed simultaneously in the above-described step. However, if it is not necessary to consider any adverse effect on the reflection electrode 105, and if the portion of the photosensitive resin film 111 not covered with the reflection electrode 105 in the display region can be removed simultaneously in the above-described step without causing any problem, the step of forming the resist film 114 may be eliminated. In this case, since the photosensitive resin film 111 may be etched after the formation of the reflection electrode 105 in the display region as shown in FIGS. 3Ia, 3Ib and 3Ic to remove the photosensitive resin film 111 in the gate terminal portion and the source terminal portion; thus revealing the connector electrode 109 as shown in FIGS. 3Na, 3Nb and 3Nc, it is possible to simplify the manufacturing steps.

Also, according to this embodiment, the end portion of the photosensitive resin film is arranged inside of the scanning line and the signal line in the display region, but the photosensitive resin film may be formed covering the TFT, a portion of the scanning line and a portion of the signal line in its end portion. In this case, since the pixel electrode can overlap a portion of the scanning line and a portion of the signal line, it is possible not only to achieve a higher aperture ratio at its maximum level, but to use the photosensitive resin film as an insulating protective film for the scanning line and the signal line. Also, it is possible to provide a structure in which the photosensitive resin film is not formed on the TFT, although its aperture ratio is lower than that of the above case. Moreover, it is possible to provide a structure in which the photosensitive resin film covers only the drain electrode of the TFT. Also, the contact hole for connecting the drain electrode of the TFT to the pixel electrode may be formed away from the TFT by elongating the drain electrode of the TFT and drawing out its elongated portion to provide a drawout structure. In this case, the drain electrode may comprise the elongated electrode portion separately from the drain electrode 108 shown in FIG. 2.

Embodiment 2

Figure 4:
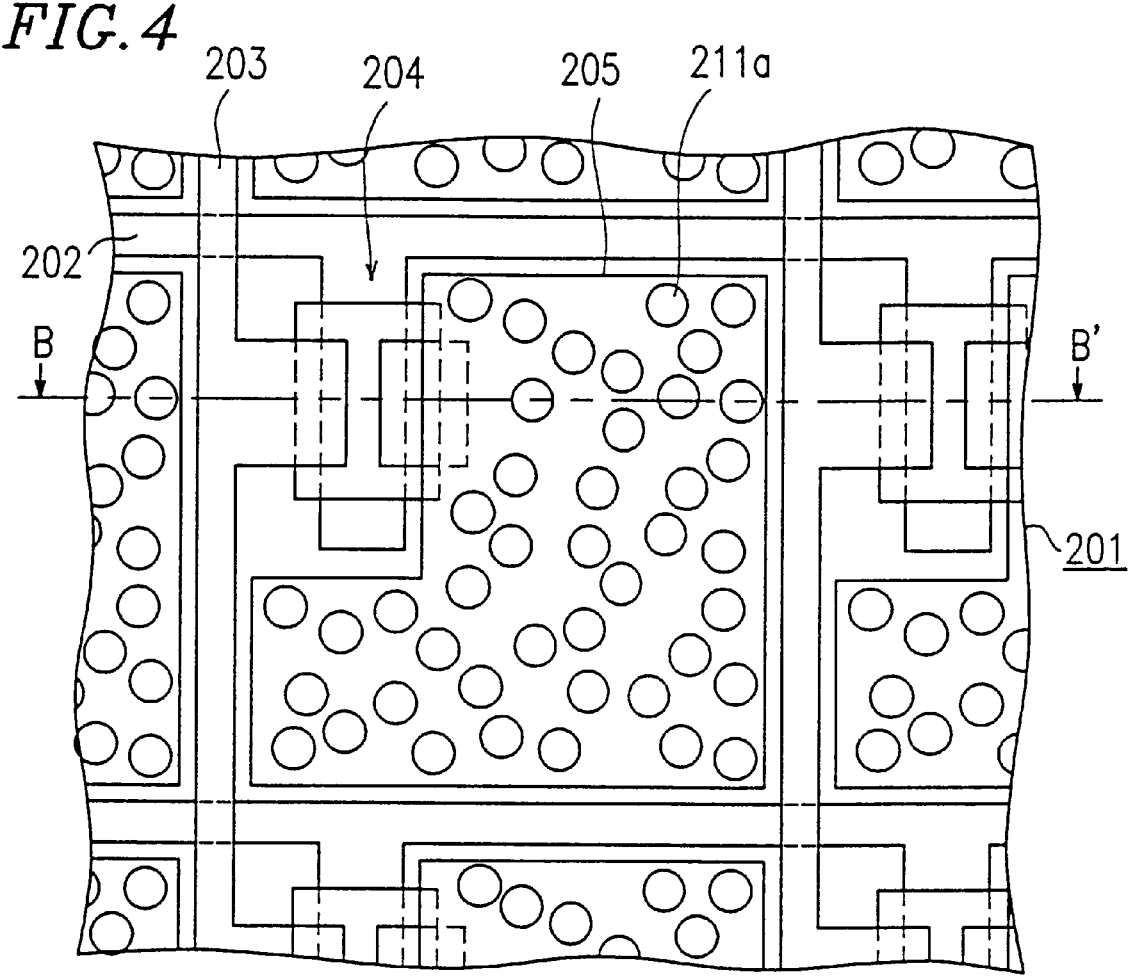
FIG. 4 is a plan view showing the structure of one pixel potion of the active matrix substrate in the reflection-type liquid crystal display apparatus according to Embodiment 2.
Figure 5:
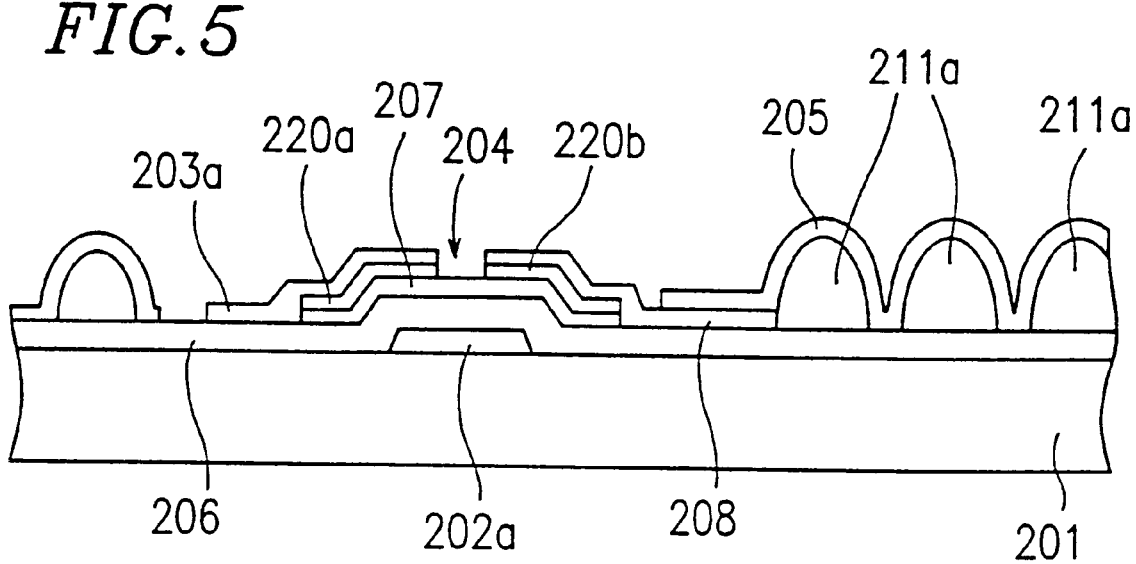
FIG. 5 is a sectional view showing the B-B' line sectional portion of FIG. 4.

FIG. 4 is a plan view showing the structure of one pixel potion of the active matrix substrate in the reflection-type liquid crystal display apparatus according to Embodiment 2, FIG. 5 is a sectional view showing the B-B' line sectional portion of FIG. 4, i.e., the structure of the TFT portion. Also, FIGS. 6Aa to 6Na are sectional views illustrating a process for manufacturing the TFT portion, FIGS. 6Ab to 6Nb are sectional views illustrating a process for manufacturing the gate terminal portion located outside of the display region on which a pixel electrode is formed in the active matrix substrate, and FIGS. 6Ac to 6Nc are sectional views illustrating a process for manufacturing the source terminal portion located outside of the display region in the active matrix substrate.

As shown in FIG. 4, the active matrix substrate comprises a pixel electrode (a reflection electrode) 205 which is formed in a matrix shape on a glass substrate 201 and also used as a reflector, and a gate bus line 202 as a scanning line and a source bus line 203 as a signal line both of which are formed as crossing to each other while passing through the vicinity of the pixel electrode. A TFT 204 as a switching element is formed in the vicinity of the crossing portion between each gate bus line 202 and each source bus line 203. A gate electrode of the TFT 204 is a portion branching from the gate bus line 202, while a source electrode of the TFT 204 is a portion branching from the source bus line 203, and a drain electrode of the TFT 204 is connected to the reflection electrode 205. A plurality of convex portions or concave portions (for example, convex portions) 211a are formed under the reflection electrode 205 so as to increase the strength of light scattering toward a direction vertical to the display screen with respect to incoming light at any angle.

In the TFT portion, a gate electrode 202a is formed on the glass substrate 201, and an insulator layer 206 is formed covering its upper portion, as shown in FIG. 5. A semiconductor layer 207 is formed thereon overlapping the gate electrode 202a, and contact layers 220a and 220b are formed covering a portion of the semiconductor layer 207 and being separated from each other by the center portion. A source electrode 203a is formed on one contact layer 220a, while a drain electrode 208 is formed on the other contact layer 220b. A reflection electrode 205 made of Al or the like, is formed partially overlapping the drain electrode 208 of the TFT 204, and electrically connected to the drain electrode 208. A plurality of convex portions 211a made of a photosensitive resin are formed under the reflection electrode 205.

In the gate terminal portion, a connector electrode 209 connected to outside elements is formed on the gate bus line 202 which is formed on the glass substrate 201, as shown in FIG. 6Mb. Also, in the source terminal portion, a connector electrode 209 connected to outside elements is formed on the source bus line 203 which is formed on the glass substrate 201, as shown in FIG. 6Mc.

The active matrix substrate can be manufactured, for example, as described below. Since the display region (the TFT portion) can be manufactured in the same manner as that of conventional liquid crystal display apparatus until a TFT 204 as shown in FIG. 6Aa is formed and, also the gate terminal portion and the source terminal portion can be manufactured in the same manner as that of conventional liquid crystal display apparatus until a connector electrode 209 made of ITO as shown FIGS. 6Ab and 6Ac is formed on the gate bus line 202 and the source bus line 203, the following illustrates a process for manufacturing the TFT portion, the gate terminal portion and the source terminal portion after these steps.

First, a photosensitive resin film 211' for the formation of the convex portions 211a under the reflection electrode 205 is applied onto a substrate, as shown in FIGS. 6Ba, 6Bb and 6Bc.

Then, the photosensitive resin film 211' is exposed through a light-shading means (reticle) 230 having a circular light-shading region and a circular light-transmitting region arranged thereon as illustrated in the related art section, as shown in FIGS. 6Ca, 6Cb and 6Cc, and developed and baked to form a photosensitive resin film 211", as shown in FIG. 6Da. At this time, the photosensitive resin film 211" is left on the connector electrode 209 of the gate terminal portion and the source terminal portion, as shown in FIGS. 6Db and 6Dc. The photosensitive resin film 211' used herein is of a positive type, and thus the portion of the photosensitive resin film 211' which is irradiated with light is removed by the exposure and developing. If the photosensitive resin film 211' is of a negative type, the portion of the photosensitive resin film 211' which is not irradiated with light would be removed.

Subsequently, the photosensitive resin film 211" this subjected to a heat treatment to provide convex portions 211a for the formation of the reflection electrode 205 having optimum reflection characteristics which increases the strength of a light scattering toward a direction vertical to the display screen with respect to incoming light at any angle, as shown in FIG. 6Ea. At this time, a photosensitive resin film 211 is also formed on the connector electrode 209 of the gate terminal portion and the source terminal portion, as shown in FIGS. 6Eb and 6Ec.

Thereafter, a reflection electrode film 205' made of Al or the like, is formed on the entire surface of the substrate covering the convex portions 211a, as shown in FIG. 6Fa. At this time, the connector electrode 209 is covered with the photosensitive resin film 211 in the gate terminal portion and the source terminal portion, and thus the reflection electrode film 205' formed thereon is not in contact with the connector electrode 209, as shown in FIGS. 6Fb and 6Fc.

Then, a resist is applied onto the reflection electrode film 205' by a spin coating technique to form a resist film 213', as shown in FIGS. 6Ga, 6Gb and 6Gc.

Subsequently, the resist film 213' is exposed and developed using a photolithography technique to form a resist pattern 213 for the formation of a reflection electrode in the display region, as shown in FIG. 6Ha. At this time, the resist film 213' is removed in the gate terminal portion and the source terminal portion, as shown in FIGS. 6Hb and 6Hc.

Thereafter, the reflection electrode film 205' is etched using the resist pattern 213 as a mask to form a reflection electrode 205 having the convex portions 211a formed thereunder for optimizing its reflection characteristics, as shown in FIG. 6Ia. At this time, the reflection electrode film 205' in the gate terminal portion and the source terminal portion is removed, as shown in FIGS. 6Ib and 6Ic.

Then, the substrate is, for example, immersed into a resist peeling solution to remove the resist pattern 213, as shown in FIG. 6Ja.

Subsequently, a resist is applied onto the entire surface of the substrate, on which the reflection electrode film 205 is formed, by a spin coating technique to form a resist film 214' as shown in FIGS. 6Ka, 6Kb and 6Kc.

Thereafter, the resist film 214' is exposed and developed using a photolithography technique to remove the resist film 214' in the gate terminal portion and the source terminal portion, thereby revealing the photosensitive resin film 211 formed on the connector electrode 209, as shown in FIGS. 6Lb and 6Lc. At this time, the resist pattern 214 is left in the display region, as shown in FIG. 6La.

Thereafter, the photosensitive resin film 211 is etched using the resist pattern 214 as a mask to remove the photosensitive resin film 211 in the gate terminal portion and the source terminal portion and reveal the connector electrode 209, as shown in FIGS. 6Mb and 6Mc.

Then, the substrate is, for example, immersed into a resist peeling solution to remove the resist pattern 214, as shown in FIG. 6Na.

The active matrix substrate thus manufactured is attached to a counter substrate having a counter electrode formed thereon, and liquid crystal is interposed between both substrates to provide a reflection-type liquid crystal display apparatus.

No corrosion or dissolution caused by a cell effect was observed between the connector electrode 209 and the reflection electrode 205 in the reflection-type liquid crystal display apparatus of this embodiment thus actually obtained. This is because the connector electrode 209 is covered with the photosensitive resin film 211 in the gate terminal portion and the source terminal portion during exposing and developing the resist film using a photolithography technique, at the time of patterning the reflection electrode film 205' to form the reflection electrode 205.

Also, since the convex portions 211 for optimizing the reflection characteristics are formed in a portion where the reflection electrode 205 is formed and then the reflection electrode 205 is formed covering the convex portions 211 during the formation of the photosensitive resin film 211 in the display region, it is possible to efficiently form a reflection electrode 205 having optimum reflection characteristics which increase the strength of light scattering toward a direction vertical to the display screen with respect to incoming light at any angle.

Additionally, according to this embodiment, the resist 214 is left in the display region, when the photosensitive resin film 211 in the gate terminal portion and the source terminal portion is removed to reveal the connector electrode 209. This is not only to prevent any adverse effect on the reflection electrode 205 and prevent the TFT 204 from being damaged, but also to prevent the portion of the photosensitive resin film 211 not covered with the reflection electrode 205 in the display region from being removed simultaneously in the above-described step. However, if it is not necessary to consider any adverse effect on the reflection electrode 205 as well as any damage to the TFT 204 due to a reason that the convex portions 211a are covered with the reflection electrode 205 and not removed in the above-described step, the step of forming the resist film 214 as shown in FIGS. 6Ka to 6Ma, FIGS. 6Kb to 6Mb and FIGS. 6Kc to 6Mc may be eliminated. In this case, since the photosensitive resin film 211 may be etched after the formation of the reflection electrode 205 in the display region, as shown in FIGS. 6Ja, 6Jb and 6Jc, to remove the photosensitive resin film 211 in the gate terminal portion and the source terminal portion and reveal the connector electrode 209, as shown in FIGS. 6Na, 6Nb and 6Nc, it is possible to simplify the manufacturing steps.

Embodiment 3

FIGS. 7Aa to 7Ta are sectional views illustrating a process for manufacturing the TFT portion of an active matrix substrate according to a further embodiment of the present invention, FIGS. 7Ab to 7Tb are sectional views illustrating a process for manufacturing the gate terminal portion, and FIGS. 7Ac to 7Tc are sectional views illustrating a process for manufacturing the source terminal portion.

The active matrix substrate can be manufactured, for example, as described below. Since the display region (the TFT portion) can be manufactured in the same manner as that of conventional liquid crystal display apparatus until a TFT 304 as shown in FIG. 7Aa is formed and also the gate terminal portion and the source terminal portion can be manufactured in the same manner as that of conventional liquid crystal display apparatus until a connector electrode 309 made of ITO as shown FIGS. 7Ab and 7Ac is formed on the gate bus line 302 and the source bus line 303, the following illustrates a process for manufacturing the TFT portion, the gate terminal portion and the source terminal portion after these steps.

First, a photosensitive resin film 311' is applied onto a substrate 301 using a spin coater at a thickness of 1 to 6 μm, preferably 1.5 to 3 μm, as shown in FIGS. 7Ba, 7Bb and 7Bc.

Then, the photosensitive resin film 311' is exposed using, for example, a stepper through any suitable light-shading means 330, as shown in FIGS. 7Ca, 7Cb and 7Cc, and developed and baked to form unevennesses which are patterned in the prescribed shape on the photosensitive resin film 311', as shown in FIG. 7Da. At this time, the photosensitive resin film 311' is left on the connector electrode 309 in the gate terminal portion and the source terminal portion, as shown in FIGS. 7Db and 7Dc. If the photosensitive resin film 311' is of a positive type, the portion of the photosensitive resin film 311' which is irradiated with light is removed by the exposure and developing. If the photosensitive resin film 311' is of a negative type, the portion of the photosensitive resin film 311' which is not irradiated with light would be removed. The positive type is used in this embodiment.

Subsequently, the photosensitive resin film 311' is subjected to a heat treatment to be cured. As a result, convex portions 311a for the formation of the reflection electrode 305 having optimum reflection characteristics which increase the strength of light scattering toward a direction vertical to the display screen with respect to incoming light at any angle can be obtained, as shown in FIG. 7Ea. At this time, a photosensitive resin film 311 is formed also on the connector electrode 309 in the gate terminal portion and the source terminal portion, as shown in FIGS. 7Eb and 7Ec. The heat treatment is carried out using any suitable means (for example, an oven). In this embodiment, the heat treatment temperature is, for example, 190 to 220° C. and the heat treatment time is, for example, 4000 seconds.

Then, a resist 314 is applied using a spin coater, as shown in FIGS. 7Fa, 7Fb and 7Fc. Moreover, the photosensitive resin film 311 is exposed through, for example, a photomask 330, as shown in FIGS. 7Ga, 7Gb and 7Gc, and developed and baked to form a contact hole 312 on the drain electrode 308, as shown in FIG. 7Ha. At this time, it is preferred that a residue of the photosensitive resin film and the resist in the contact hole 312 portion be sufficiently removed. Then, the resultant substrate is subjected to an $O_2$ plasma ashing treatment so as to provide a good connection between the drain electrode 308 and the later-formed reflection electrode 305. For example, according to this embodiment, the plasma ashing treatment is carried out using a batch-type ashing device at a substrate temperature of 100 to 140° C., an $O_2$ flow rate of 5000 to 10000 sccm, a plasma discharge power of 5000 W and a plasma discharge time of 60 to 200 seconds (for example, 180 seconds). Alternatively, approximately 3 to 10% of $CF_4$ gas may be blended into the $O_2$. The plasma discharge time may be a period that the photosensitive resin film is removed without any residue.

Then, the resist is removed in any suitable peeling vessel (not shown), as shown in FIGS. 7Ia, 7Ib and 7Ic.

Then, Al is deposited by sputtering to form a reflection electrode 305, as shown in FIG. 7Ja. According to this embodiment, the thickness of the reflection electrode 305 is 1000 to 5000 Å, preferably 1000 to 2000 Å.

Moreover, a resist 314 is applied onto the reflection electrode 305 using a spin coater, as shown in FIG. 7Ka.

Figure 8A:
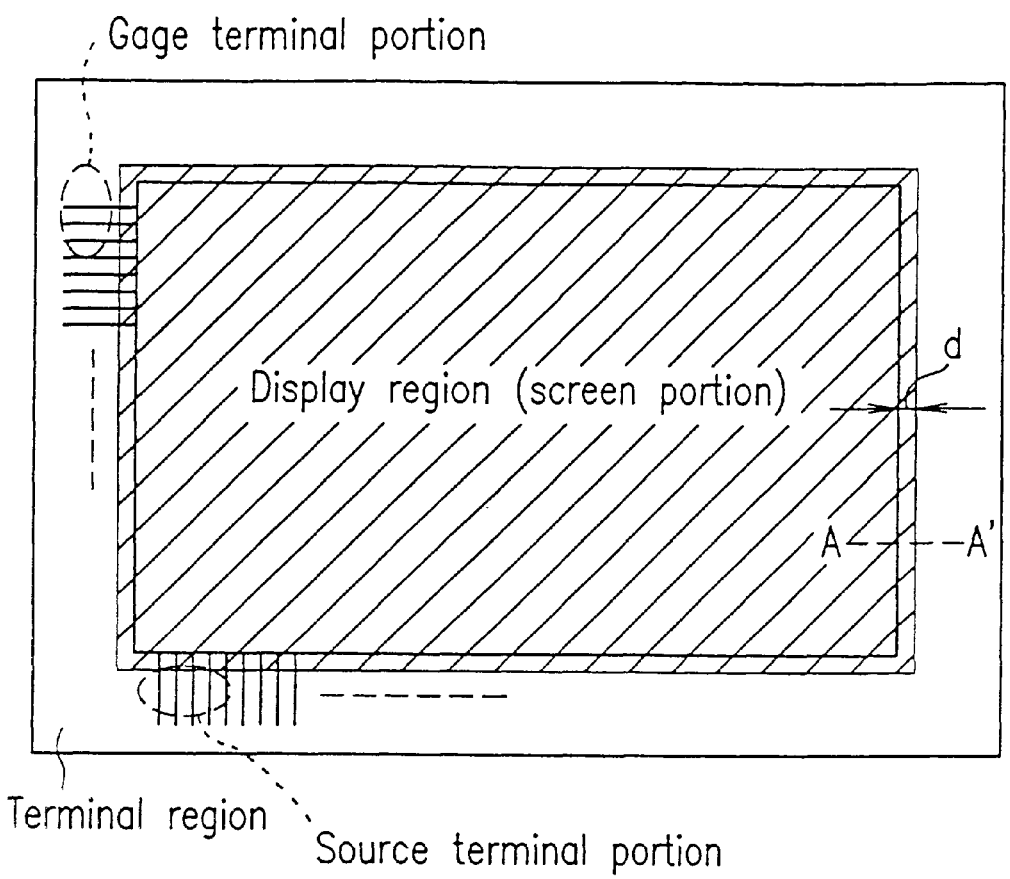
FIG. 8A is a plan view illustrating a process for manufacturing the reflection-type liquid crystal display apparatus of Embodiment 3.
Figure 8B:
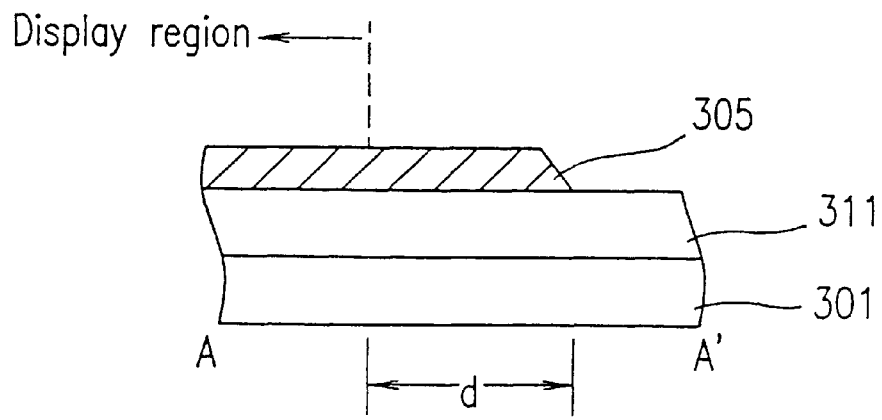
FIG. 8B is an enlarged sectional view of its A-A' portion.

Then, the resist is exposed in pattern 330 using a stepper so that the reflection electrode 305 covers at least the display region and is at a continuous state, as shown in FIG. 7La. Preferably, it is patterned so that the reflection electrode (the pixel electrode) 305 resides over the outside of the display region, as shown in FIGS. 8A and 8B. The width d of a portion of the reflection electrode residing outside of the display region is for example about 0.2 mm to about 0.4 mm (preferably, about 0.3 mm). At this time, the connector electrode 309 is exposed with a light, as shown in FIGS. 7Lb and 7Lc.

The exposed resist 314 is removed by developing, as shown in FIGS. 7M*a*, 7M*b* and 7M*c*. At this time, the connector electrode (ITO) 309 and the reflection electrode (Al) 305 are not directly in contact to each other due to the presence of the photosensitive resin film 311 residing therebetween, and therefore no electric corrosion occurs.

Then, a portion of the reflection electrode 305 on the connector electrode 309 is etched using the resist as a protective mask, as shown in FIGS. 7N*a*, 7N*b* and 7N*c*. According to this embodiment, an etchant containing phosphoric acid, acetic acid and nitric acid is used.

Moreover, the photosensitive resin film 311 on the connector electrode 309 is removed by an $O_2$ plasma ashing treatment, as shown in FIGS. 7O*b* and 7O*c*. For example, according to this embodiment, the plasma ashing treatment is carried out using a batch-type ashing device at a substrate temperature of 100 to 140° C., an $O_2$ flow rate of 5000 to 10000 sccm, a plasma discharge power of 5000 W and a plasma discharge time of 600 to 1500 seconds (for example, 1200 seconds). Alternatively, approximately 3 to 10% of $CF_4$ gas may be blended into the $O_2$. The plasma discharge time may be a period that the photosensitive resin film is removed without any residue. At this time, because the reflection electrode 305 acts as a mask in the display region, the photosensitive resin film 311 located under the reflection electrode 305 is not affected by the $O_2$ plasma ashing treatment, as shown in FIG. 7O*a*. Accordingly, the photosensitive resin film 311 retains its properties as an insulating protective film, and thus contributes to the improvement of the reliability of the TFT element.

Figure 9A:
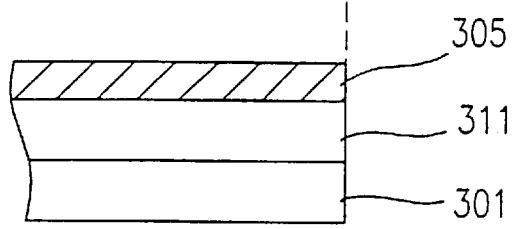
FIGS. 9A and 9B are schematic sectional views illustrating a case where a reflection electrode is formed corresponding to the display region in order to compare it with Embodiment 3.
Figure 9B:
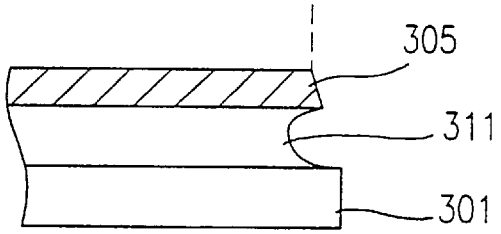
Figure 10A:
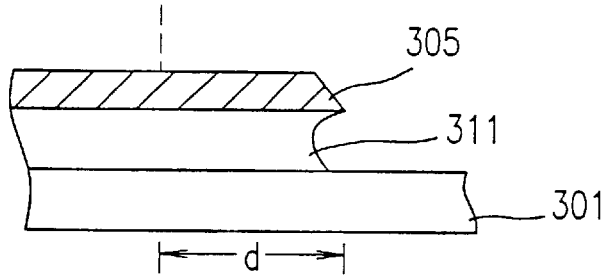
FIGS. 10A and 10B are sectional views illustrating a process for manufacturing the reflection-type liquid crystal display apparatus according to Embodiment 3.
Figure 10B:
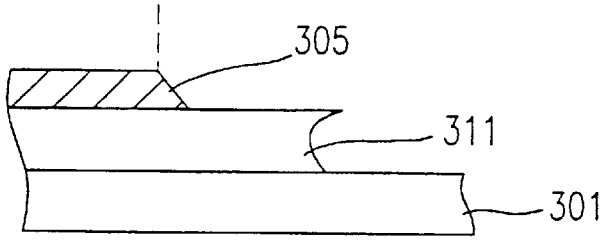
Figure 11:
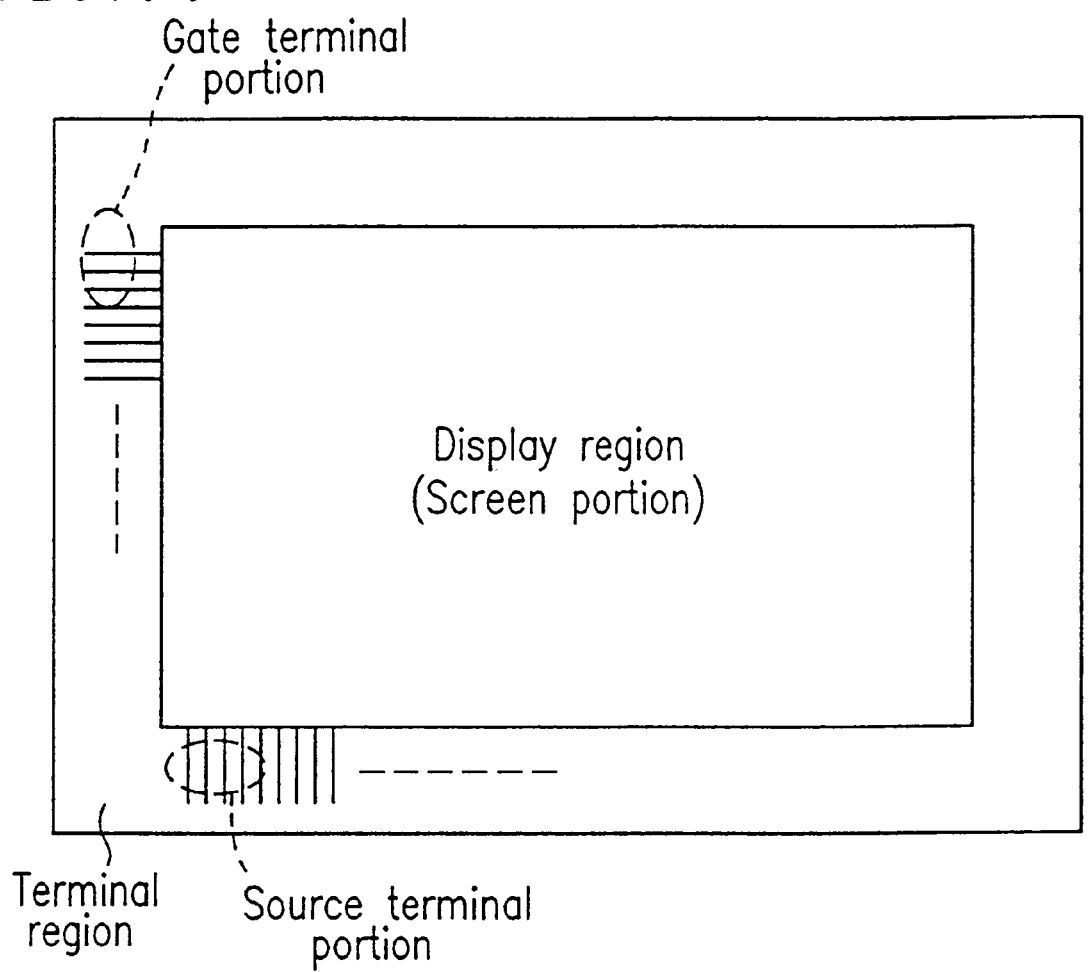
FIG. 11 is a plan view showing the structure of an active matrix substrate in conventional reflection-type liquid crystal display apparatus.
Figure 12:
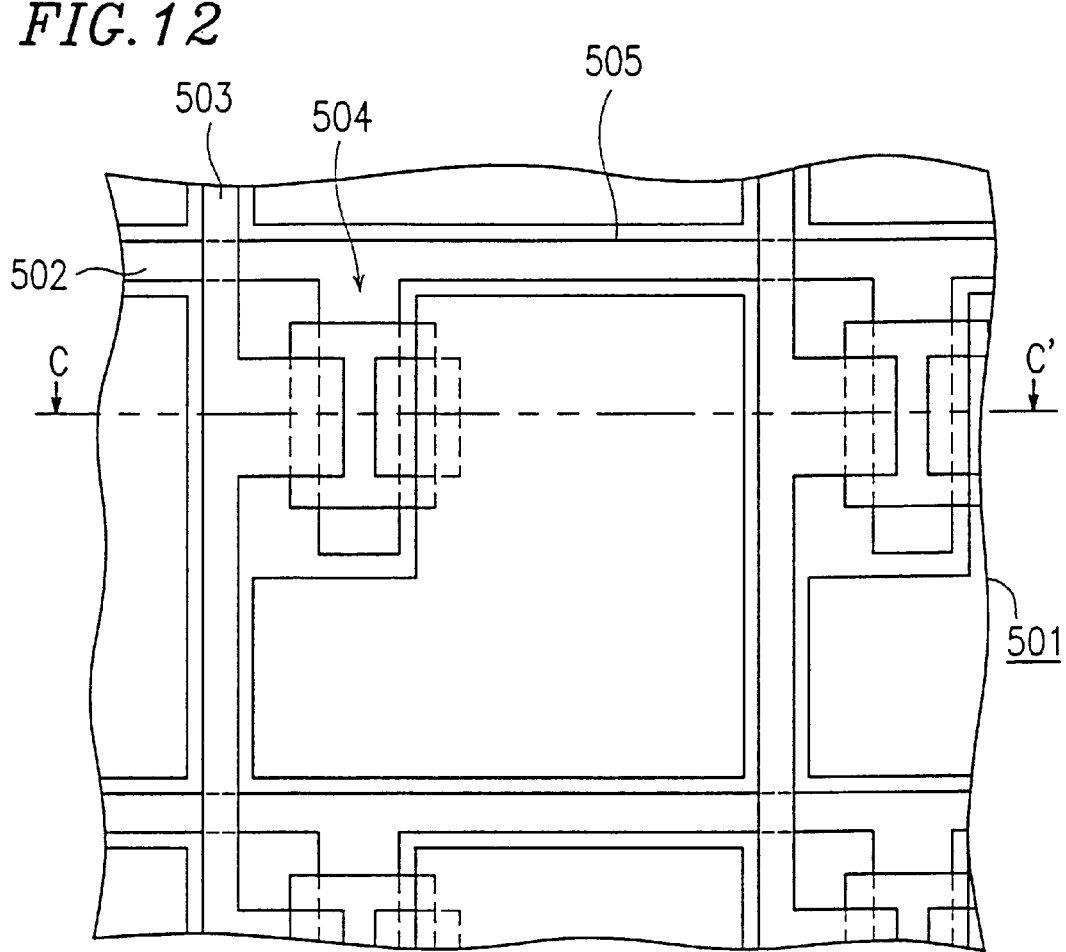
FIG. 12 is a plan view showing the structure of one pixel portion of the active matrix substrate in conventional reflection-type liquid crystal display apparatus.
Figure 13A:
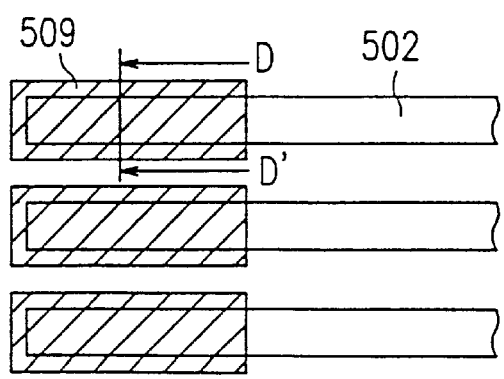
FIGS. 13A and 13B are plan views showing the structure of the gate terminal portion and the source terminal portion in conventional reflection-type liquid crystal display apparatus.
Figure 13B:
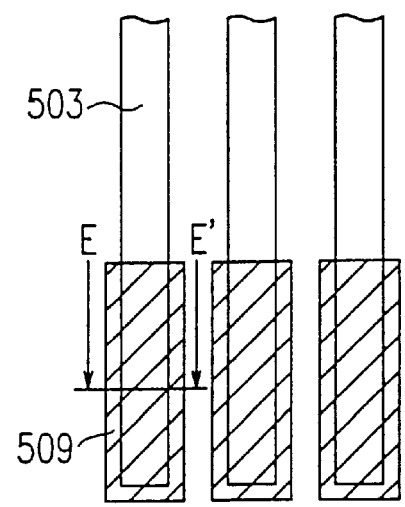
Figure 15A:
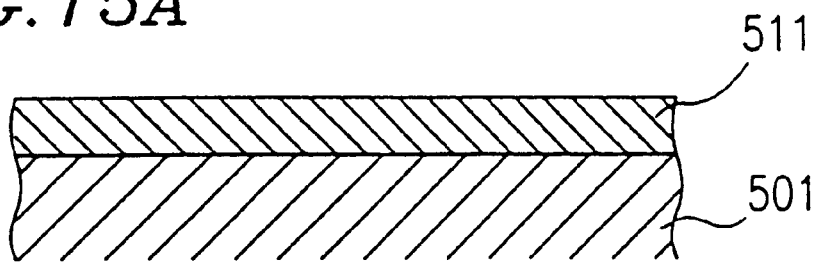
FIGS. 15A to 15D are sectional views illustrating a process for manufacturing conventional reflection-type liquid crystal display apparatus.
Figure 15B:
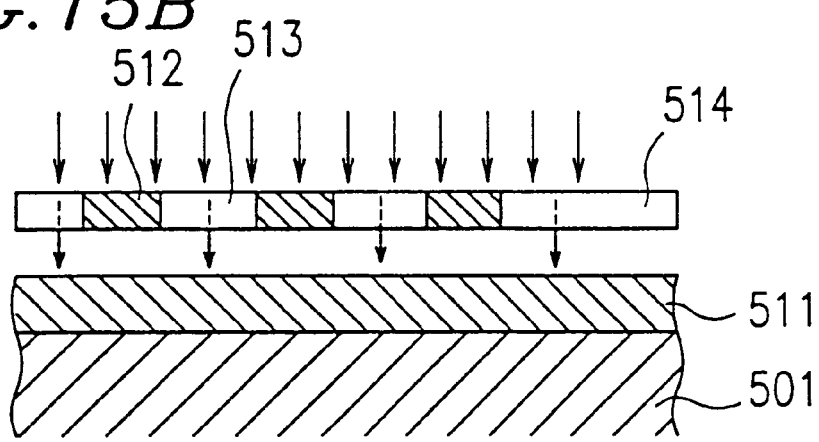
Figure 15C:
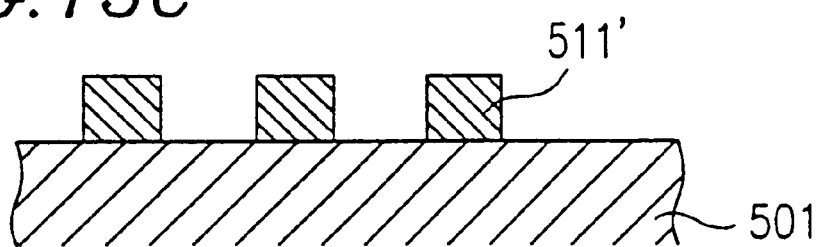
Figure 15D:
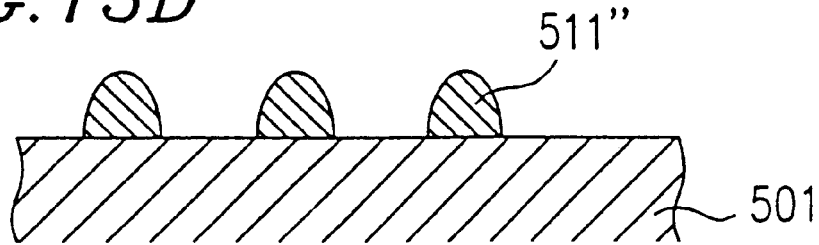
Figure 16:
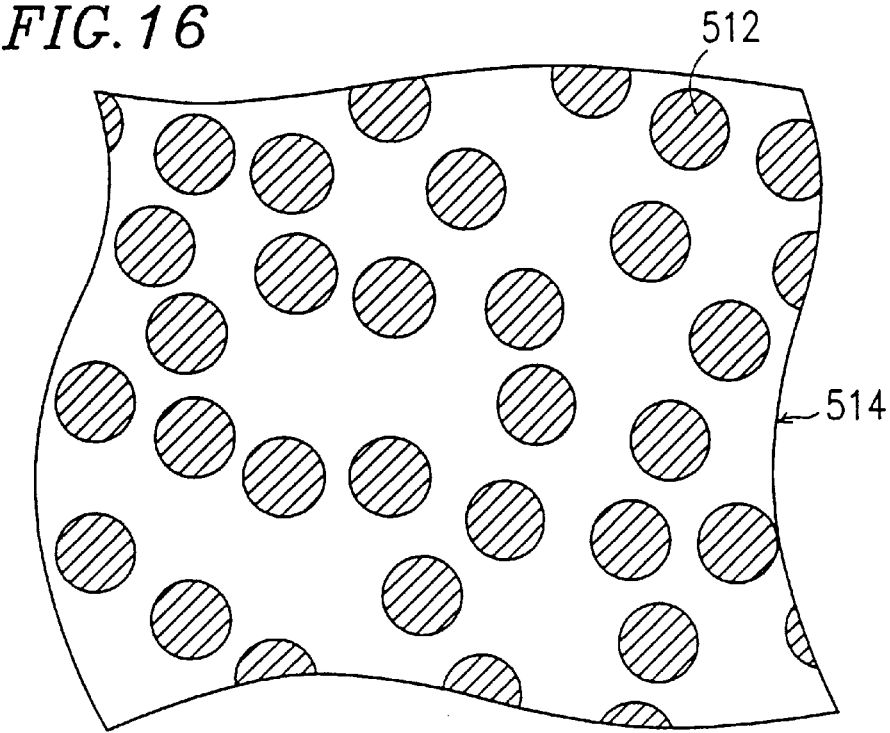
FIG. 16 is a plan view showing the structure of a light-shading means used for the formation of convex portions and concave portions in a process for manufacturing a reflection-type liquid crystal display apparatus.
Figure 17:
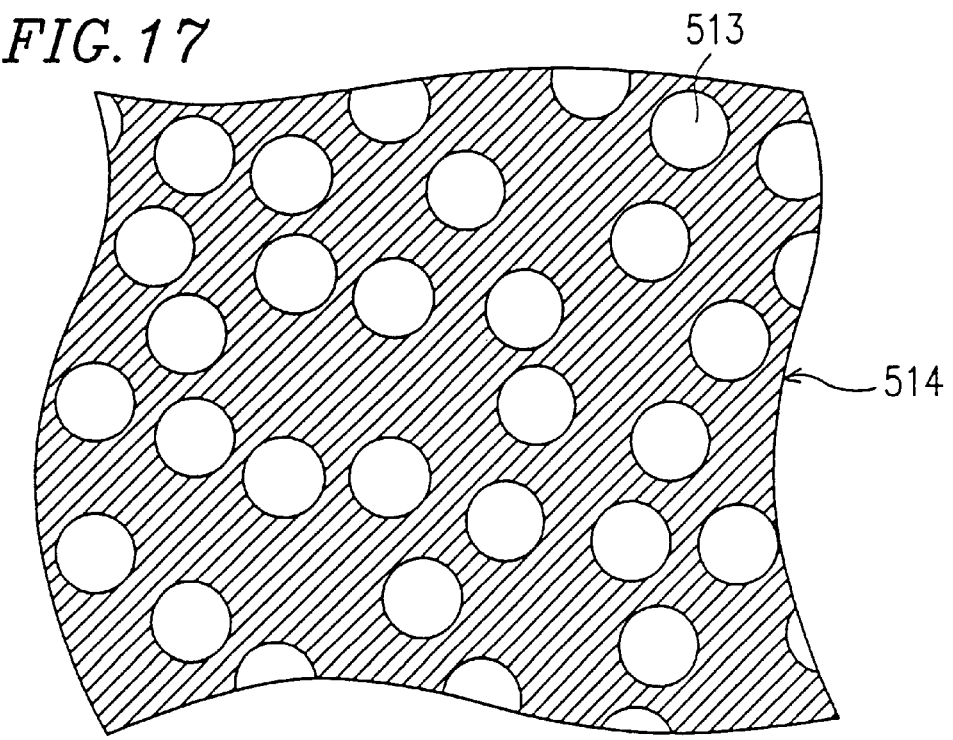
FIG. 17 is a plan view showing another structure of a light-shading means used for the formation of convex portions and concave portions in a process for manufacturing a reflection-type liquid crystal display apparatus.
Figure 18:
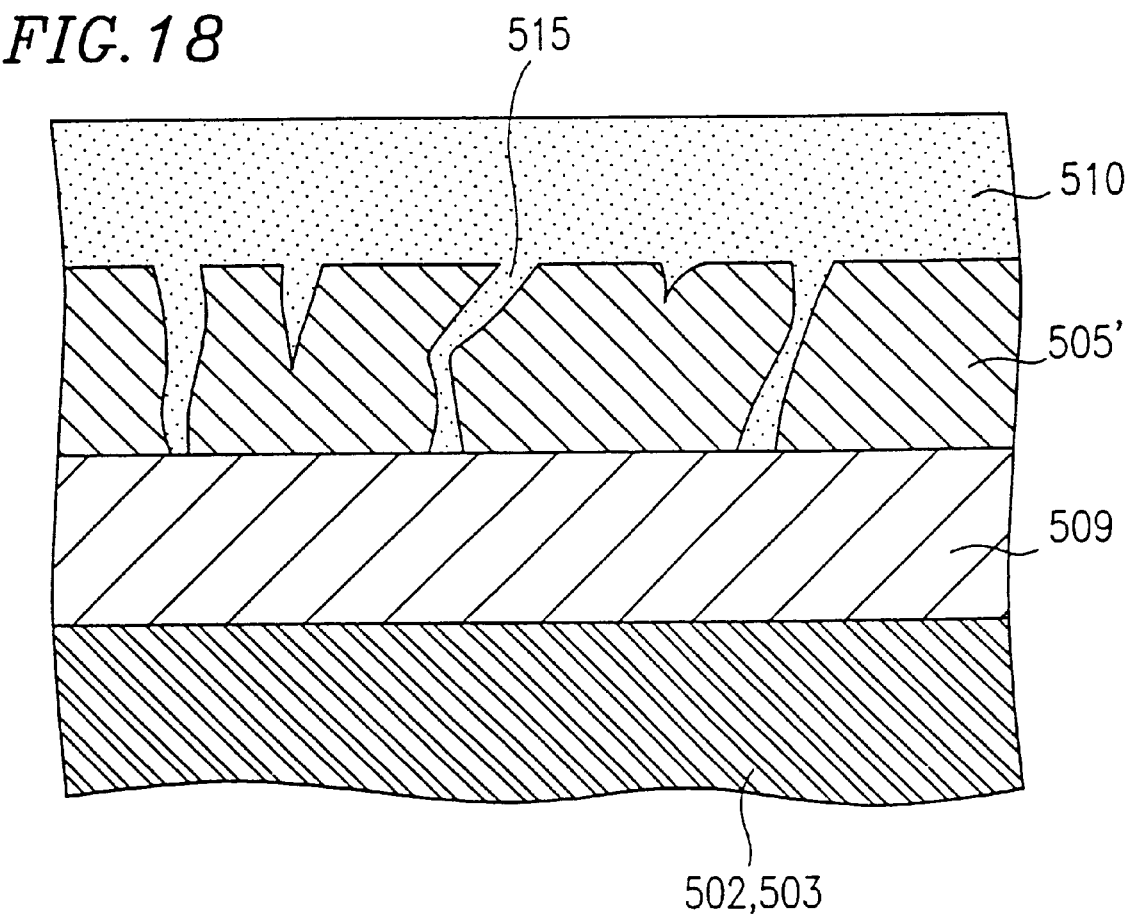
FIG. 18 is a sectional view illustrating the corrosion and dissolution caused by a cell effect which occurrs in conventional reflection-type liquid crystal display apparatus.

When the reflection electrode 305 is formed as exactly corresponding to the display region as shown in FIG. 9A, the photosensitive resin film 311 under the reflection electrode 305 is partially ashed at the periphery of the display region as shown in FIG. 9B. (According to the above-described ashing conditions, it is ashed from the periphery portion of the display region up to for example 10–20 μm inside). This is because an ashing reaction of the ashing treatment proceeds in arbitrary directions. Thus, the periphery of the display region is in an overhanging shape. This overhanging-shaped reflection electrode is liable to be peeled off in the following steps (for example, the liquid crystal rubbing step). The partial removal of the reflection electrode causes deterioration of the display characteristics and adversely affects the apparatus. On the other hand, when the reflection electrode 305 is formed over the outside of the display region as shown in FIGS. 8A and 8B, the photosensitive resin film 311 in the display region is not ashed. This is because only a portion of the photosensitive resin film 311 located under the reflection electrode 305 is ashed, as shown in FIG. 10A. As a result, since the photosensitive resin film 311 is left in the display region as shown in FIG. 10B, the deterioration of the display characteristics due to the peeling of the reflection electrode 305 in the display region does not occur. Furthermore, because the overhanging-shaped reflection electrode 305 residing outside of the display region is etched simultaneously in separating the continuous reflection electrodes into each pixel unit, adverse effects such as the reduction of the yield, the contamination of the apparatus, and the like due to the peeling of the overhanging-shaped reflection electrode residing outside of the display region do not take place. Moreover, the deterioration of the off characteristics will be prevented without the formation of an SiNx film. Therefore, it is preferred that the reflection electrode 305 be formed over the outside of the display region.

Moreover, a resist 314 is applied using a spin coater, as shown in FIG. 7P*a*. Then, the reflection electrode 309 covering the display region at a continuous state as shown in FIG. 7Q*a* is separated as corresponding to a pixel electrode. If the reflection electrode 305 is also formed outside of the display region, a portion of the reflection electrode 305 located therein is also removed. This step is carried out by exposing in pattern the resist using, for example, a stepper. Moreover, the exposed resist is removed by developing, as shown in FIG. 7R*a*.

Moreover, the reflection electrode 305 in the display region is etched using the resist 314 as a protective mask to separate the reflection electrode 305 as corresponding to a pixel electrode. Simultaneously, the reflection electrode (for example, made of Al) 305 in the periphery of the display region is etched to provide the prescribed shaped-pixel electrode.

Then, the resist 314 is removed in any suitable peeling vessel (not shown), as shown in FIG. 7T*a*. Thus, the reflection electrode 305 is formed.

The active matrix substrate thus manufactured is attached to a counter substrate having a counter electrode formed thereon, and liquid crystal is interposed between both substrates to provide a reflection-type liquid crystal display apparatus.

The following illustrates the functions of the present invention.

According to the present invention, a connector electrode is covered with a photosensitive resin film at the time of patterning a reflection electrode film to form a pixel electrode. Thus, when it is exposed and developed using a photolithography technique, the resist film is not developed under the condition that the reflection electrode film is in contact with the connector electrode, and therefore no cell effect occurs therebetween.

The photosensitive resin film can be used as an insulating film for electrically insulating the pixel electrode from other members by forming it at least under the pixel electrode. Accordingly, it is possible to enlarge the area of the pixel electrode, and provide a higher aperture ratio by forming the pixel electrode and the photosensitive resin film located thereunder by overlapping the TFT, a portion of the scanning line and a portion of the signal line. Also, the photosensitive resin film can be used as an insulating protective film by forming it so as to cover the TFT, a portion of the scanning line and a portion of the signal line. Also, it is possible to electrically connect the pixel electrode to the drain electrode of the TFT through a contact hole by forming the contact hole and then forming the pixel electrode thereon at the time of patterning the photosensitive resin film.

Also, it is possible to efficiently form the pixel electrode having optimum reflection characteristics by forming the photosensitive resin film in a portion where the pixel electrode is formed to form a plurality of convex portions and a plurality of concave portions for optimizing the reflection characteristics, and then forming the pixel electrode so as to cover these convex portions and concave portions. In this case, since it is possible to increase the strength of light scattering toward a direction vertical to the display screen with respect to incoming light at any angle, a bright display can be obtained with a paper white color.

Since no corrosion or dissolution caused by cell effect occurs even when the connector electrode is made from ITO and the pixel electrode is made from Al, it is possible to improve the manufacturing yield.

In a preferred embodiment, the photosensitive resin film is removed by ashing it with an $O_2$ plasma or an $O_2$ plasma containing $CF_4$ (conveniently referred to as an $O_2$ plasma ashing). That is, since the photosensitive resin film can be removed without using any photolithography technique, complicated procedures (such as, positioning a photomask, etching) become unnecessary thereby simplifying the manufacturing process. Moreover, because the substrate is treated at a relatively lower temperature (100 to 140° C.) according to the $O_2$ plasma ashing, it is possible to prevent the photosensitive resin film from being deformed by heat.

In another preferred embodiment, the $O_2$ plasma ashing is carried out under the condition that the pixel electrode in the display region is continuous and thereafter the continuous pixel electrode is separated to form each pixel electrode. As a result, the following disadvantages will be prevented: When the $O_2$ plasma ashing is carried out under the condition that the pixel electrodes in the display region are each separated, the photosensitive resin film located under each pixel electrode will partially be removed due to the ashing reaction of the photosensitive resin film which proceeds in arbitrary directions between each pixel electrodes. As a result, each reflection electrode (the pixel electrode) overhangs the outside of the photosensitive resin film. These overhanging-shaped reflection electrodes are liable to be peeled off in the following steps (for example, the liquid crystal rubbing step). The peeled portions of the reflection electrode become contaminants to provide adverse effects such as a reduction in the yield, deterioration of the display characteristics, the contamination of the apparatus, reattachment to other apparatus, and the like. According to the present invention, these disadvantages can be eliminated by performing the $O_2$ plasma ashing under the condition that the pixel electrodes in the display region are continuous. Moreover, the following benefits can be achieved: When the photosensitive resin film in the TFT element portion is removed, the TFT elements are directly in contact with a liquid crystal alignment film made of, for example, polyimide. The polyimide film in the vicinity of the TFT element portion is polarized on its surface to deteriorate the off characteristics due to the backgate effect when TFT is driven for a long period of time. Ordinarily, the entire portion of the TFT element is protected with an SiNx film so as to reduce the deterioration of the off characteristics. The photosensitive resin film can reduce the deterioration of the off characteristics as the SiNx film does. It is possible to leave the photosensitive resin film in the TFT element portion by keeping the reflection electrode at a continuous state, which leads to the elimination of a step of further forming the SiNx film.

In another preferred embodiment, the $O_2$ plasma ashing is carried out under the condition that each pixel electrode is continuous in the display region and also resides over the outside of said display region, and thereafter the continuous pixel electrodes are separated to form each pixel electrode and at the same time the reflection electrodes (the pixel electrodes) located outside of the display region are removed. As a result, because the overhanged portion of each reflection electrode only resides outside of the display region and also the overhanged portions are removed at the time of separating the pixel electrodes, it causes no adverse effect on the characteristics of the liquid crystal display apparatus as well as the manufacturing devices. Therefore, it is possible to prevent disadvantages as described above due to overhanged reflection electrodes in the display region.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A process for manufacturing a reflection-type liquid crystal display apparatus, said reflection-type liquid crystal display apparatus comprising a pair of oppositely arranged substrates a liquid crystal layer interposed therebetween, and on one of said substrates, a plurality of pixel electrodes with a reflective function formed in a matrix shape, a plurality of scanning lines and a plurality of signal lines crossing each other while passing through the vicinity of said pixel electrode, a thin film transistor provided in the vicinity of the crossing portion between each scanning line and each signal line and connected to said pixel electrode, and a connector electrode on the terminal portion of each scanning line and each signal line located outside of the display region, said process comprising the steps of:

forming said scanning lines, said signal lines, said thin film transistor and said connector electrode on said substrate;

forming a photosensitive resin film covering at least said connector electrode, and forming a reflection electrode film on said photosensitive resin film and other portions;

removing a portion of said reflection electrode film located at least on said connector electrode, and patterning said reflection electrode film so that said pixel electrode resides in said display region; and removing a portion of said photosensitive resin film located on said connector electrode to reveal said connector electrode.

2. The process for manufacturing a reflection-type liquid crystal display apparatus of claim 1, comprising forming said photosensitive resin film covering said connector electrode and being located at least under said pixel electrode, forming a contact hole in said photosensitive resin film, and forming said pixel electrode as electrically connecting to the drain electrode of said thin film transistor through said contact hole.

3. The process for manufacturing a reflection-type liquid crystal display apparatus of claim 1, comprising forming said photosensitive resin film in a portion where said pixel electrode is formed, forming a plurality of convex portions and a plurality of concave portions from said photosensitive resin film, and forming said pixel electrode as covering said convex portions and said concave portions.

4. The process for manufacturing a reflection-type liquid crystal display apparatus of claim 1, wherein said connector electrode is made from ITO, and said pixel electrode is made from Al.

5. The process for manufacturing a reflection-type liquid crystal display apparatus of claim 1, wherein the step of revealing said connector electrode is carried out by an ashing in an $O_2$ plasma or an $O_2$ plasma containing $CF_4$.

6. The process for manufacturing a reflection-type liquid crystal display apparatus of claim 1, wherein the steps of patterning said reflection electrode film and revealing said connector electrode comprise:

patterning said reflection electrode film in a state that said pixel electrode is continuous in said display region;

removing a portion of said photosensitive resin film located on said connector electrode by ashing to reveal said connector electrode; and patterning said reflection electrode film so as to separate said continuous pixel electrode.

7. The process for manufacturing a reflection-type liquid crystal display apparatus of claim 1, wherein the steps of patterning said reflection electrode film and revealing said connector electrode comprise:

patterning said reflection electrode film in a state that said pixel electrode is continuous in said display region and extended over the outside of said display region;

removing a portion of said photosensitive resin film located on said connector electrode by ashing to reveal said connector electrode; and patterning said reflection electrode film so as to separate said continuous pixel electrode and remove a portion of said pixel electrode located outside of said display region.

* * * * *